United States Patent
Wei

(10) Patent No.: US 10,469,736 B2
(45) Date of Patent: *Nov. 5, 2019

(54) CONTROL METHOD AND ELECTRONIC APPARATUS

(71) Applicant: GUANGDONG OPPO MOBILE TELECOMMUNICATIONS CORP., LTD., Dongguan, Guangdong (CN)

(72) Inventor: Yi Wei, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,211

(22) Filed: May 8, 2018

(65) Prior Publication Data

US 2018/0255234 A1 Sep. 6, 2018

Related U.S. Application Data

(63) Continuation of application No. 15/807,024, filed on Nov. 8, 2017, now Pat. No. 10,277,803.

(30) Foreign Application Priority Data

Nov. 29, 2016 (CN) .......................... 2016 1 1078974

(51) Int. Cl.
*H04N 5/232* (2006.01)
*H04N 5/347* (2011.01)
(Continued)

(52) U.S. Cl.
CPC ....... *H04N 5/23216* (2013.01); *G06T 3/4015* (2013.01); *H04N 1/3871* (2013.01);
(Continued)

(58) Field of Classification Search
CPC ............. H04N 2209/046; H04N 5/347; H04N 5/23232; H04N 5/351; H04N 5/23293;
(Continued)

(56) References Cited

U.S. PATENT DOCUMENTS

| 9,179,113 B2 | 11/2015 | Tachi | |
|---|---|---|---|
| 2004/0165110 A1* | 8/2004 | Peters | .................. G06T 7/20 348/441 |

(Continued)

FOREIGN PATENT DOCUMENTS

| CN | 102547080 A | 7/2012 |
|---|---|---|
| CN | 101815157 A | 1/2013 |

(Continued)

OTHER PUBLICATIONS

The First Chinese Office Action dated May 26, 2017; Appln. No. 201611078974.7.

(Continued)

*Primary Examiner* — Xi Wang
(74) *Attorney, Agent, or Firm* — Hodgson Russ LLP

(57) ABSTRACT

A control method for controlling an electronic apparatus includes controlling an image sensor to output a merged image and a color block image of a same scene; defining a first predetermined region using the merged image based on a user input; converting the color block image into a first imitating image and converting the merged image into a restored image, wherein a second predetermined region in the color block image is converted using a first interpolating method, and the second predetermined region corresponds to the first predetermined region, and wherein a third predetermined region in the merged image is converted using a second interpolating method, and the third predetermined region corresponds to a first region outside the first predetermined region; obtaining a second imitating image by synthesizing the first imitating image and the restored image. An electronic apparatus is also provided.

20 Claims, 25 Drawing Sheets

(51) Int. Cl.
*H04N 5/359* (2011.01)
*H04N 9/04* (2006.01)
*H04N 9/64* (2006.01)
*G06T 3/40* (2006.01)
*H04N 1/387* (2006.01)

(52) U.S. Cl.
CPC ..... *H04N 5/23229* (2013.01); *H04N 5/23293* (2013.01); *H04N 5/347* (2013.01); *H04N 5/359* (2013.01); *H04N 9/045* (2013.01); *H04N 9/04515* (2018.08); *H04N 9/04557* (2018.08); *H04N 9/646* (2013.01); *H04N 2209/046* (2013.01)

(58) Field of Classification Search
CPC ............ H04N 5/23212; H04N 5/23229; G06T 3/4015; G06T 3/4053; G06T 3/4007; G06T 5/002; G06T 5/20
USPC ......... 348/221.1, 222.1, 252, 254, 241, 272, 348/277, 294; 396/155
See application file for complete search history.

(56) References Cited

U.S. PATENT DOCUMENTS

| 2009/0059026 | A1* | 3/2009 | Katagiri ................. H04N 19/40 348/222.1 |
|---|---|---|---|
| 2009/0167917 | A1 | 7/2009 | Miki |
| 2009/0200451 | A1 | 8/2009 | Conners |
| 2010/0026839 | A1* | 2/2010 | Border ................. G06T 3/4053 348/231.2 |
| 2010/0128039 | A1 | 5/2010 | Cho |
| 2011/0273597 | A1 | 11/2011 | Ishiwata |
| 2015/0103210 | A1* | 4/2015 | Inoue ..................... G02B 7/346 348/239 |
| 2016/0037060 | A1 | 2/2016 | Lim et al. |
| 2017/0019615 | A1* | 1/2017 | Yeh .................... H04N 5/23232 |
| 2017/0171470 | A1 | 6/2017 | Sakioka et al. |
| 2018/0150936 | A1 | 5/2018 | Wei |
| 2018/0152625 | A1 | 5/2018 | Wei |

FOREIGN PATENT DOCUMENTS

| CN | 104423946 A | 3/2015 |
|---|---|---|
| CN | 104580910 A | 4/2015 |
| CN | 105578078 A | 5/2016 |
| CN | 105611258 A | 5/2016 |
| CN | 106357967 A | 1/2017 |
| DE | 102011100350 A1 | 11/2012 |
| EP | 2753082 A1 | 7/2014 |

OTHER PUBLICATIONS

The Second Chinese Office Action dated Jul. 10, 2017; Appln. No. 201611078974.7.
The Third Chinese Office Action dated Sep. 6, 2017; Appln. No. 201611078974.7.
The Chinese Notification to Grant Patent Right dated Nov. 10, 2017; Appln. No. 201611078974.7.
USPTO, Office Action for U.S. Appl. No. 15/807,024, dated Sep. 10, 2018.

* cited by examiner

CONTROL METHOD AND ELECTRONIC APPARATUS

CROSS REFERENCE TO RELATED APPLICATION

This application is a continuation application, which claims priority to U.S. application Ser. No. 15/807,024, filed on Nov. 8, 2017, which claims priority to Chinese Application No. 201611078974.7, filed on Nov. 29, 2016. The entire disclosure of the above applications is incorporated herein by reference.

FIELD OF THE DISCLOSURE

The present disclosure relates to a technical field of image processing, and more specifically, the present disclosure relates to a control method and an electronic apparatus.

BACKGROUND OF THE DISCLOSURE

Current image sensors include a pixel unit array and a color filter unit array disposed over the pixel unit array. Each color filter unit in the color filter unit array covers a corresponding pixel unit. Each pixel unit includes a plurality of photosensitive pixels. In operation, the image sensors may be controlled to be exposed to light and output a merged image. The merged image includes a merged pixel array. The plurality of photosensitive pixels of a same pixel unit are merged into a merged photosensitive pixel for output. In this manner, a signal to noise ratio of the merged image can be increased. However, resolution of the merged image is decreased. The image sensors may also be controlled to be exposed to light and output a color block image of a higher pixel number. The color block image includes an original pixel array. Each photosensitive pixel outputs a corresponding original pixel. However, because a plurality of original pixels corresponding to a same color filter unit have a same color, resolution of the color block image is still not enhanced. Therefore, the color block image of the higher pixel number needs to be converted into an imitating image of the higher pixel number through interpolation. The imitating image may include a plurality of imitating pixels arranged in a Bayer pattern. The imitating image may be converted into a true color image. Through interpolation, clarity of the true color image may be enhanced, however, at higher resource and time consumption costs, which result in a longer image taking time and a poor user experience.

DESCRIPTION OF THE DRAWINGS

Aspects and advantages of the present disclosure become apparent and easy to be understood from the following description of embodiments in conjunction with the accompanying drawings.

DETAILED DESCRIPTION OF THE EMBODIMENTS

Embodiments of the present disclosure are described in detail below and examples of the embodiments are illustrated in the accompanying drawings, wherein same or similar labels throughout the present disclosure represent corresponding same or similar elements or corresponding elements having same or similar functions. The description of the embodiments with reference to the accompanying drawings below is exemplary, aims at illustrating the present disclosure, and cannot be considered as limitations to the present disclosure.

Figure 1:
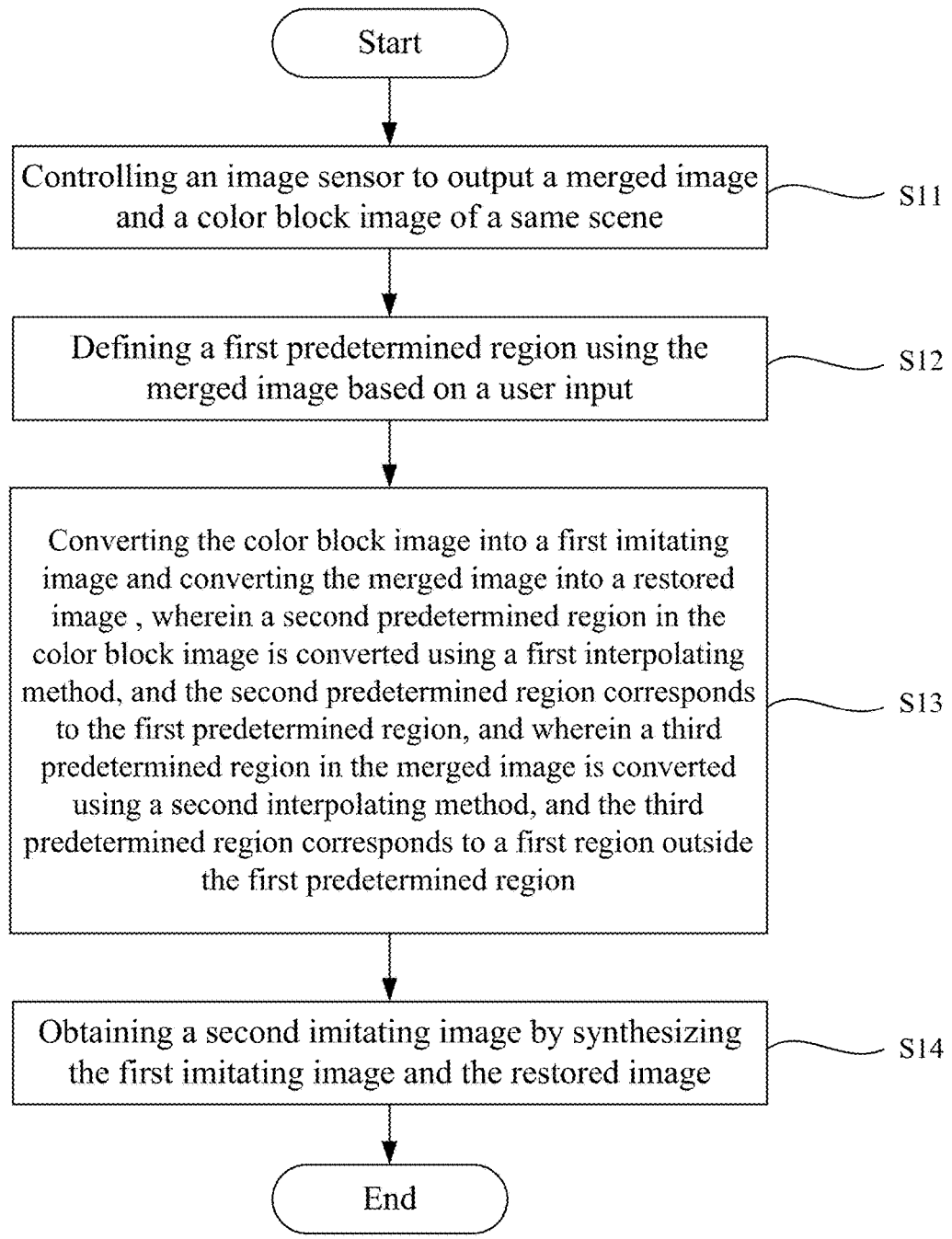
FIG. 1 is a schematic flowchart of a control method in accordance with an embodiment of the present disclosure.
Figure 2:
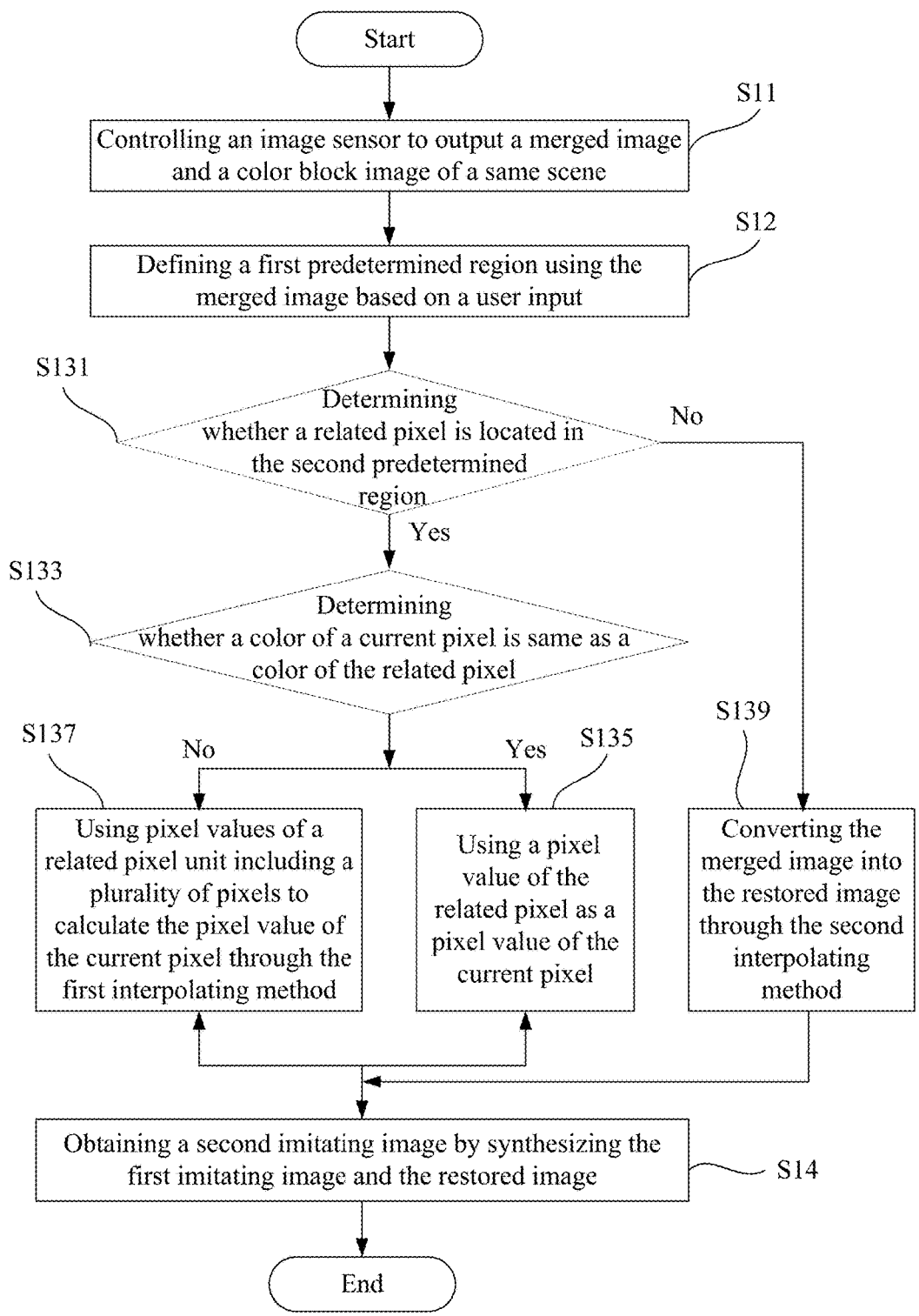
FIG. 2 is a schematic flowchart of a control method in accordance with another embodiment of the present disclosure.

In FIGS. 1 and 2, in an embodiment, a control method for controlling an electronic apparatus is provided. The electronic apparatus includes a camera module. The camera module includes an image sensor. The image sensor includes a photosensitive pixel unit array and a color filter unit array disposed over the photosensitive pixel unit array. Each color filter unit covers a corresponding photosensitive pixel unit. The photosensitive pixel unit array includes a plurality of photosensitive pixel units each including a plurality of photosensitive pixels. The control method includes the following operations.

At block S11, controlling the image sensor to output a merged image and a color block image of a same scene. The merged image includes a plurality of merged pixels arranged in a predetermined array pattern. Each of the plurality of merged pixels is output by a corresponding merged photosensitive pixel. The plurality of photosensitive pixels of a corresponding photosensitive pixel unit of the photosensitive pixel unit array are merged into the corresponding merged photosensitive pixel. The color block image includes a plurality of image pixel units arranged in the predetermined array pattern. Each of the plurality of image pixel units includes a plurality of original pixels having a same color. Each of the plurality of original pixels is output by a corresponding photosensitive pixel of the plurality of photosensitive pixels.

At block S12, defining a first predetermined region using the merged image based on a user input.

At block S13, converting the color block image into a first imitating image and converting the merged image into a restored image. A second predetermined region in the color block image is converted using a first interpolating method, and the second predetermined region corresponds to the first predetermined region. The first imitating image includes a plurality of imitating pixels arranged in the predetermined array pattern, and same in pixel number as the plurality of photosensitive pixels. That is, the plurality of imitating pixels are same in pixel number as the plurality of image pixel units. A third predetermined region in the merged image is converted using a second interpolating method, and the third predetermined region corresponds to a first region outside the first predetermined region. The restored image includes a plurality of restored pixels arranged in the predetermined array pattern. The complexities of the second interpolating method are lower than those of the first interpolating method.

The plurality of imitating pixels include a current pixel, and the plurality of original pixels of a first image pixel unit of the plurality of image pixel units include a related pixel corresponding to a position of the current pixel. Converting the color block image into the first imitating image and converting the merged image into the restored image includes the following operations.

At block S131, determining whether the related pixel is located in the second predetermined region.

At block S133, when the related pixel is located in the second predetermined region, determining whether a color of the current pixel is same as a color of the related pixel.

At block S135, when the color of the current pixel is same as the color of the related pixel, using a pixel value of the related pixel as a pixel value of the current pixel.

At block S137, when the color of the current pixel is different from the color of the related pixel, using pixel values of a related pixel unit including a plurality of pixels to calculate the pixel value of the current pixel through the first interpolating method. A color of the plurality of pixels of the related pixel unit is same as the current pixel, and the plurality of pixels of the related pixel unit are located in a first set of image pixel units in the plurality of image pixel units. The first set of image pixel units neighbor the first image pixel unit.

At block S139, when the related pixel is not located in the second predetermined region, converting the merged image into the restored image through the second interpolating method.

At block S14, obtaining a second imitating image by synthesizing the first imitating image and the restored image.

Figure 3:
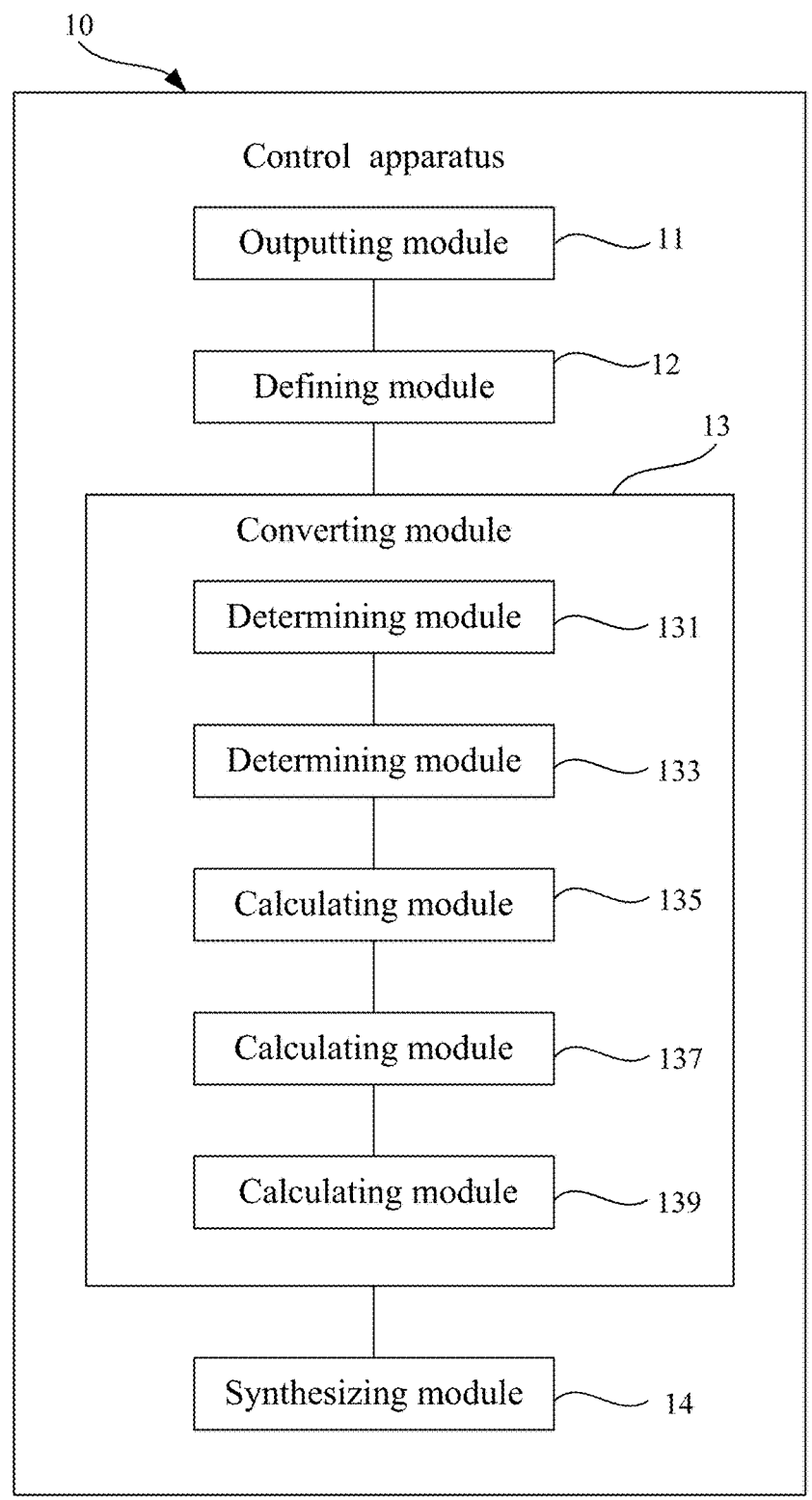
FIG. 3 is a schematic functional block diagram of a control apparatus in accordance with an embodiment of the present disclosure.

Referring FIG. 3, the control method, in an embodiment, may be implemented by a control apparatus 10.

Figure 26:
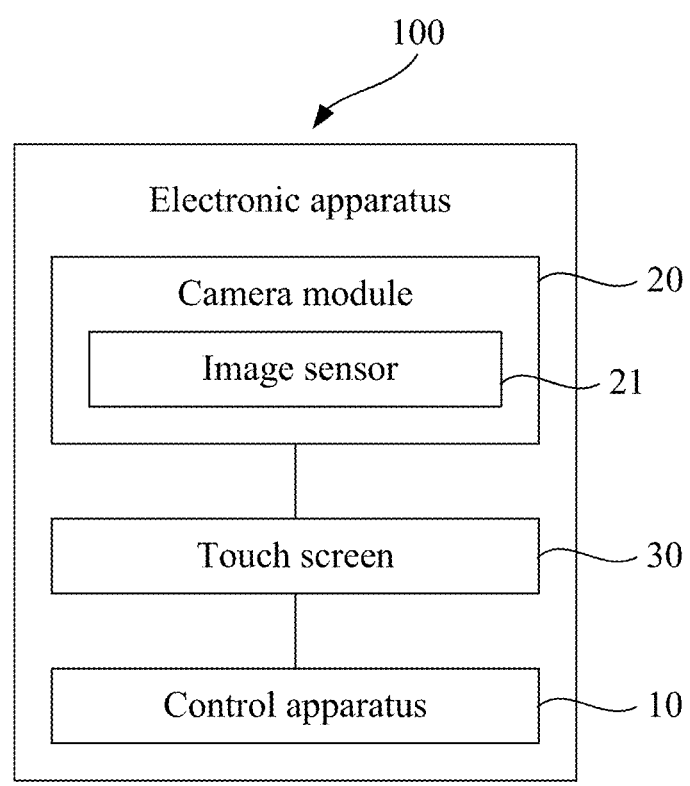
FIG. 26 is a functional block diagram of an electronic apparatus in accordance with an embodiment of the present disclosure.

In FIG. 26, the control apparatus 10 is used to control an electronic apparatus 100. The electronic apparatus 100 includes a camera module 20. The camera module 20 includes an image sensor 21. The image sensor 21 includes a photosensitive pixel unit array and a color filter unit array disposed over the photosensitive pixel unit array. Each color filter unit covers a corresponding photosensitive pixel unit. The photosensitive pixel unit array includes a plurality of photosensitive pixel units each including a plurality of photosensitive pixels. In FIG. 3, the control apparatus 10 includes an outputting module 11, a defining module 12, a converting module 13, and a synthesizing module 14.

The outputting module 11 is configured to control the image sensor 21 to output a merged image and a color block image of a same scene. The merged image includes a plurality of merged pixels arranged in a predetermined array pattern. Each of the plurality of merged pixels is output by a corresponding merged photosensitive pixel. The plurality of photosensitive pixels of a corresponding photosensitive pixel unit of the photosensitive pixel unit array are merged into the corresponding merged photosensitive pixel. The color block image includes a plurality of image pixel units arranged in the predetermined array pattern. Each of the plurality of image pixel units includes a plurality of original pixels having a same color. Each of the plurality of original pixels is output by a corresponding photosensitive pixel of the plurality of photosensitive pixels.

The defining module 12 is configured to define a first predetermined region using the merged image based on a user input.

The converting module 13 is configured to convert the color block image into a first imitating image and convert the merged image into a restored image. A second predetermined region in the color block image is converted using a first interpolating method, and the second predetermined region corresponds to the first predetermined region. The first imitating image includes a plurality of imitating pixels arranged in the predetermined array pattern, and same in pixel number as the plurality of photosensitive pixels. That is, the plurality of imitating pixels are same in pixel number as the plurality of image pixel units. A third predetermined region in the merged image is converted using a second interpolating method, and the third predetermined region corresponds to a first region outside the first predetermined region. The restored image includes a plurality of restored pixels arranged in the predetermined array pattern. The complexities of the second interpolating method are lower than those of the first interpolating method.

The plurality of imitating pixels include a current pixel, and the plurality of original pixels of a first image pixel unit of the plurality of image pixel units include a related pixel corresponding to a position of the current pixel. The converting module 13 includes a determining module 131, a determining module 133, a calculating module 135, a calculating module 137, and a calculating module 139.

The determining module 131 is configured to determine whether the related pixel is located in the second predetermined region.

The determining module 133 is configured to, when the related pixel is located in the second predetermined region, determine whether a color of the current pixel is same as a color of the related pixel.

The calculating module 135 is configured to, when the color of the current pixel is same as the color of the related pixel, use a pixel value of the related pixel as a pixel value of the current pixel.

The calculating module 137 is configured to, when the color of the current pixel is different from the color of the related pixel, use pixel values of a related pixel unit including a plurality of pixels to calculate the pixel value of the current pixel through the first interpolating method. A color of the plurality of pixels of the related pixel unit is same as the current pixel, and the plurality of pixels of the related pixel unit are located in a first set of image pixel units in the plurality of image pixel units. The first set of image pixel units neighbor the first image pixel unit.

The calculating module 139 is configured to, when the related pixel is not located in the second predetermined region, converting the merged image into the restored image through the second interpolating method.

The synthesizing module 14 is configured to obtain a second imitating image by synthesizing the first imitating image and the restored image.

That is, the block S11 may be implemented by the outputting module 11. The block S12 may be implemented by the defining module 12. The block S12 may be implemented by the defining module 12. The block S13 may be implemented by the converting module 13. The block S131 may be implemented by the determining module 131. The block S133 may be implemented by the determining module 133. The block S135 may be implemented by the calculating module 135. The block S137 may be implemented by the calculating module 137. The block S139 may be implemented by the calculating module 139. The block S14 may be implemented by the synthesizing module 14.

It is to be noted that a term "imitating image" used herein refers to a first image arranged in a first array pattern converted from a second image arranged in a second array pattern. The first image imitates a third image taken using a first image sensor that includes a plurality of photosensitive pixels arranged in the first array pattern such as a Bayer pattern. Similar to the third image, the first image may be directly processed into a true color image. A term "imitating pixel" used herein refers to a pixel in the "imitating image" that imitates a pixel output by a photosensitive pixel of the first image sensor. A term "restored image" used herein refers to a fourth image arranged in the first array pattern converted from a fifth image arranged in the first array pattern. A number of pixels of the fourth image is restored to be same as that of the third image. Similar to the first image, the fourth image may be directly processed into a true color image. A term "restored pixel" used herein refers to a pixel in the "restored image" having a same size as a photosensitive pixel of the first image sensor.

It is to be noted that a term "pixel number" refers to a total number of pixels of a portion of an image, wherein the portion of the image may be the entire image, a plurality of image pixel units of the image, or a plurality of pixels of the image.

It is to be understood that the control method, in an embodiment, uses the first interpolating method to process the second predetermined region in the color block image and uses the second interpolating method to process the third predetermined region in the merged image. The second predetermined region corresponds to the first predetermined region, and the third predetermined region corresponds to the first region outside the first predetermined region. The first predetermined region may be defined based on the user input. Complexities include a temporal complexity and a spatial complexity. Compared to the first interpolating method, both the temporal complexity and the spatial complexity of the second interpolating method are lower than those of the first interpolating method. In this manner, during image taking, the image sensor 21 outputs the color block image and the merged image. The first interpolating method of the higher complexity is applied only to the second predetermined region in the color block image. Therefore, an amount of image data to be processed, and time to process the image data are effectively reduced, and resolution of a main part that the user is concerned about, i.e. a part corresponding to the first predetermined region, is increased, thereby enhancing a user experience.

Figure 4:
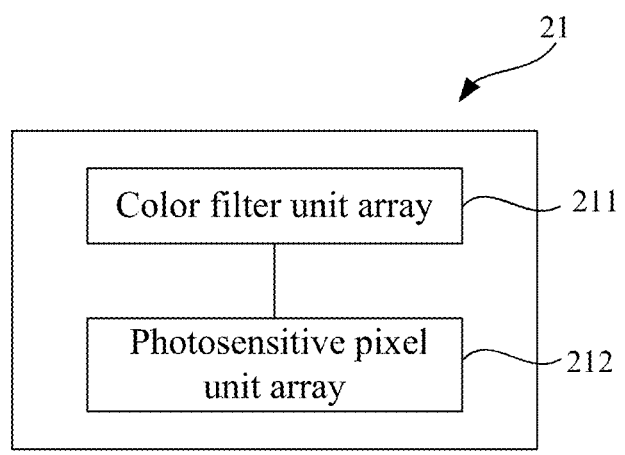
FIG. 4 is a schematic block diagram of an image sensor in accordance with an embodiment of the present disclosure.
Figure 7:
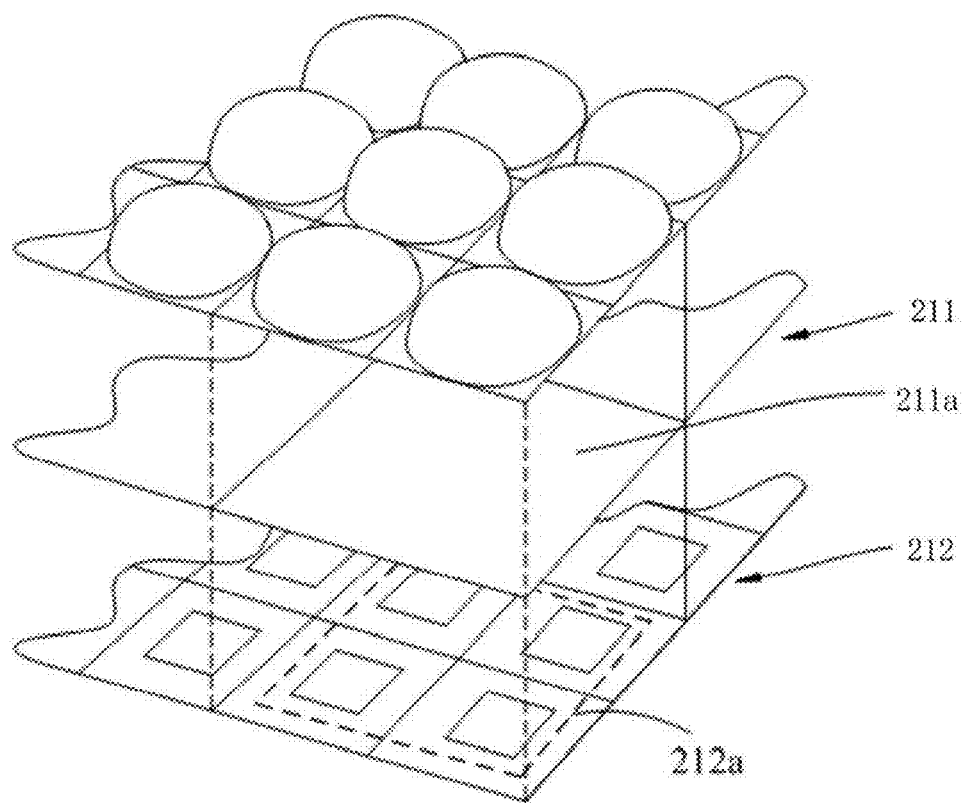
FIG. 7 is a schematic structural diagram of an image sensor in accordance with an embodiment of the present disclosure.

FIGS. 4 and 7 illustrate the image sensor 21 including a photosensitive pixel unit array 212 and a color filter unit array 211 disposed over the photosensitive pixel unit array 212.

Figure 5:
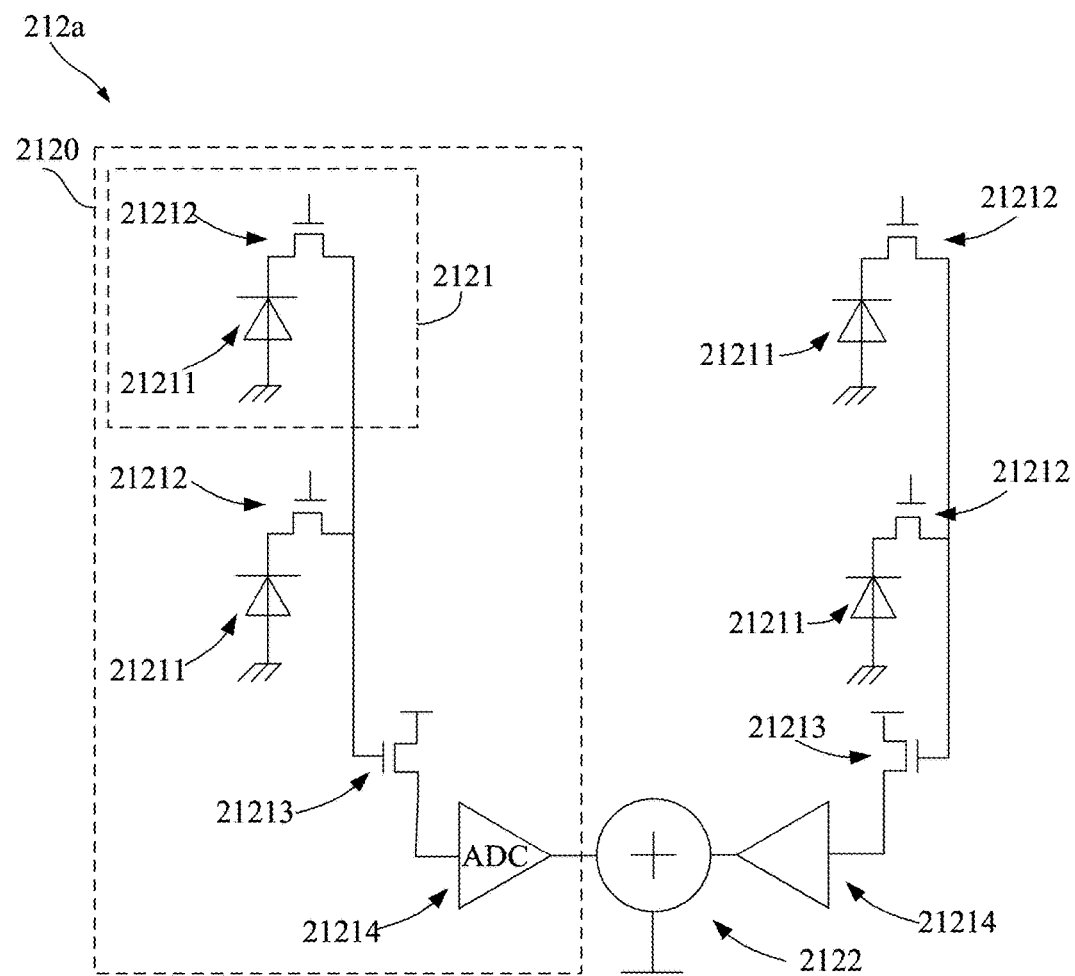
FIG. 5 is a schematic circuit diagram of a photosensitive pixel unit of the image sensor in accordance with an embodiment of the present disclosure.

Further, in FIGS. 4, 5, and 7, the photosensitive pixel unit array 212 includes a plurality of photosensitive pixel units 212a. Each photosensitive pixel unit 212a includes a plurality of photosensitive pixels 2121 adjacent to each other. In FIG. 5, each photosensitive pixel 2121 includes a photosensitive element 21211 and a transfer transistor 21212. The photosensitive element 21211 may be a photodiode and the transfer transistor 21212 may be a MOS transistor.

In FIGS. 4 and 7, the color filter unit array 211 includes a plurality of color filter units 211a. Each color filter unit 211a covers a corresponding photosensitive pixel unit 212a.

Figure 6:
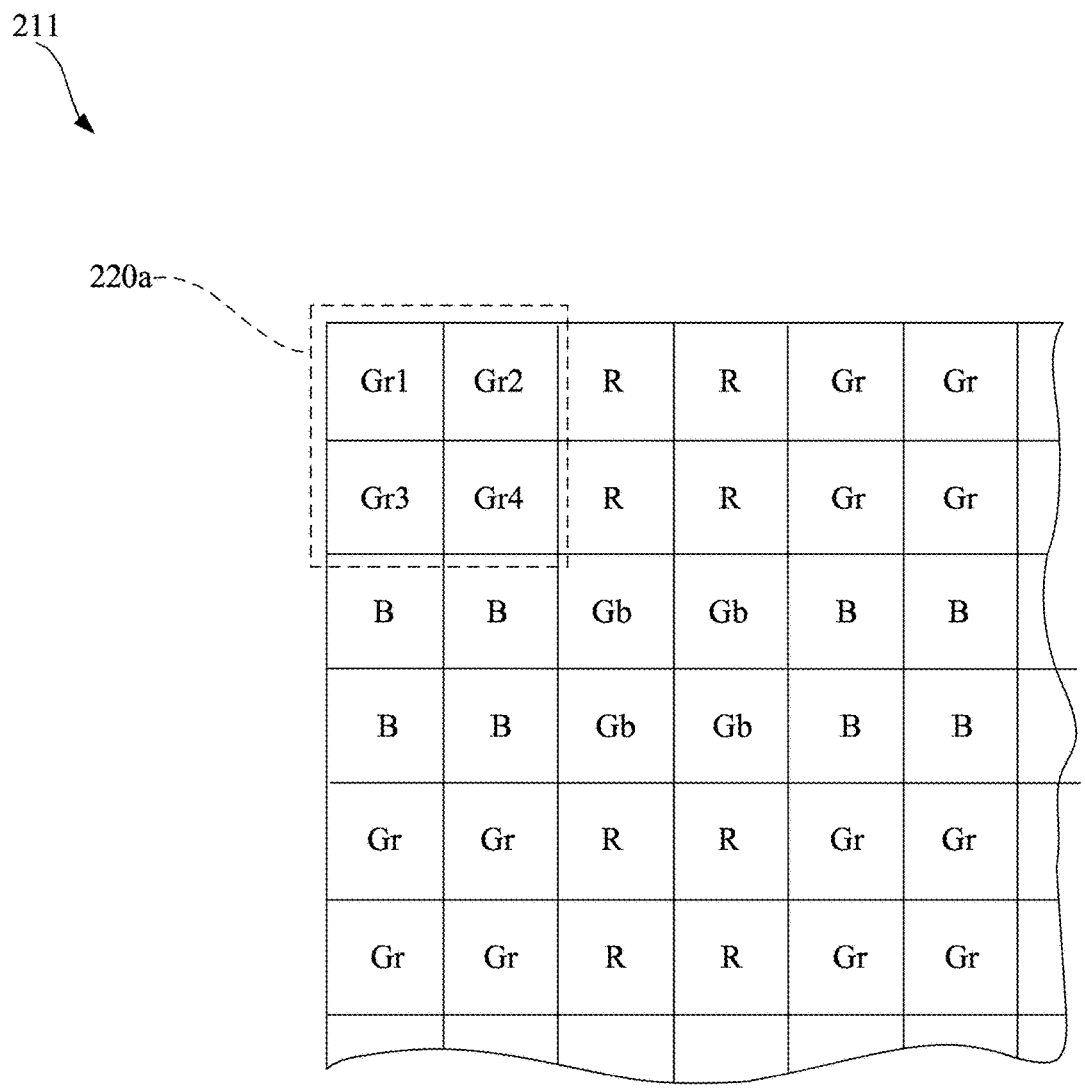
FIG. 6 is a schematic diagram of a color filter unit in accordance with an embodiment of the present disclosure.

Specifically, in FIGS. 4 and 6, in some examples, the color filter unit array 211 is arranged in a Bayer pattern. That is, four color filter units 211a adjacent to each other are a red color filter unit, a blue color filter unit and two green color filter units.

In FIGS. 5 and 7, each photosensitive pixel unit 212a corresponds to a color filter unit 211a having a uniform color. If a photosensitive pixel unit 212a includes n photosensitive elements 21211 adjacent to each other, then a color filter unit 211a covers the n photosensitive elements 21211 in the photosensitive pixel unit 212a. The color filter unit 211a may be integrally constructed or may be n independent color filters assembled together.

In FIG. 5, in an embodiment, each photosensitive pixel unit 212a includes four photosensitive pixels 2121 adjacent to each other. Two of the photosensitive pixels 2121 adjacent to each other form a photosensitive pixel sub-unit 2120 together. The photosensitive pixel sub-unit 2120 further includes a source follower 21213 and an analog-to-digital converter (ADC) 21214. The photosensitive pixel unit 212a further includes an adder 2122. Each transfer transistor 21212 in the photosensitive pixel sub-unit 2120 has a terminal coupled to a cathode of the corresponding photosensitive element 21211. Each transfer transistor 21212 in the photosensitive pixel sub-unit 2120 has another terminal coupled to a gate terminal of the common source follower 21213. A source terminal of the source follower 21213 is coupled to the ADC 21214. The source follower 21213 may be a MOS transistor. Two photosensitive pixel sub-units 2120 are coupled to the adder 2122 through corresponding source followers 21213 and corresponding ADCs 21214.

That is, four photosensitive elements 21211 adjacent to each other in a photosensitive pixel unit 212a of the image sensor 21 commonly use a color filter unit 211a having a uniform color. Each photosensitive element 21211 is coupled to a corresponding transfer transistor 21212, and two photosensitive elements 21211 adjacent to each other are coupled to a common source follower 21213 and a common ADC 21214. The four photosensitive elements 21211 adjacent to each other are coupled to a common adder 2122.

Further, the four photosensitive elements 21211 are arranged in a 2*2 array. The two photosensitive elements 21211 in the photosensitive pixel sub-unit 2120 may be located in a same column.

In FIGS. 5 and 7, during imaging, when each two photosensitive pixel sub-units 2120, i.e., each four photosensitive elements 21211, covered by the same color filter unit 211a are exposed to light at the same time, the pixels may be merged and a merged image may be output.

Specifically, the photosensitive element 21211 is configured to convert light into charges. The generated charges are proportional to intensity of the light. The transfer transistor 21212 is configured to control conduction or cutoff of a circuit based on a control signal. When the circuit conducts, the source follower 21213 is configured to convert the charges generated by the photosensitive element 21211 being exposed to light into a voltage signal. The ADC 21214 is configured to convert the voltage signal into a digital signal. The adder 2122 is configured to add two digital signals and output commonly to the control apparatus 10 in FIG. 26 coupled to the image sensor 21 in FIG. 26 for processing.

Figure 8:
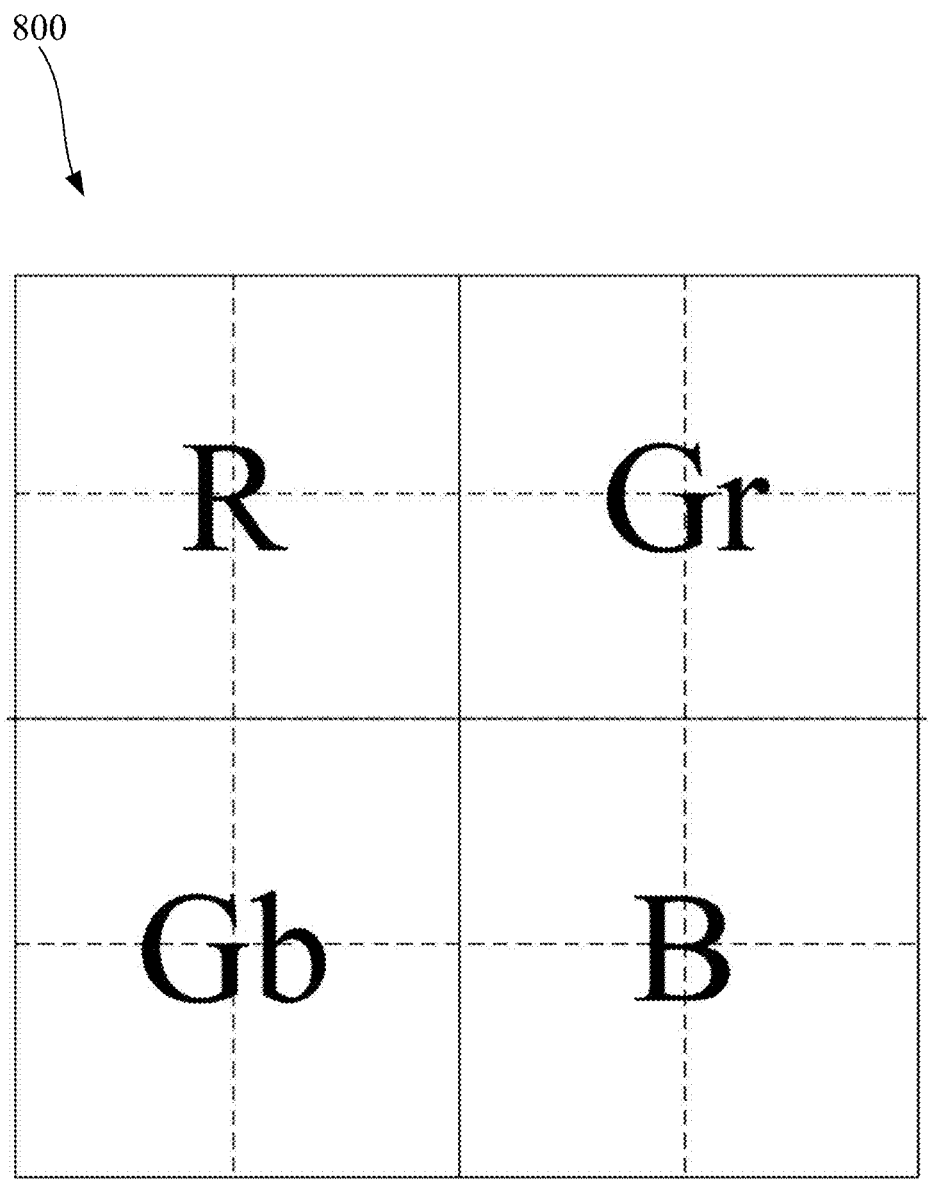
FIG. 8 is a schematic diagram of a state of a merged image in accordance with an embodiment of the present disclosure.

In FIGS. 4 and 8, taking a 16 M image sensor 21 as an example, the image sensor 21 may merge 16 M of photosensitive pixels into 4 M of merged photosensitive pixels. That is, the image sensor 21 may output the merged image 800. The merged image 800 includes a plurality of merged pixels. As shown in FIG. 8, a size of each merged pixel corresponds to a size of a corresponding merged photosensitive pixel and a size of each of four squares in each merged pixel corresponds to a size of a corresponding photosensitive pixel. After merging, a size of a merged photosensitive pixel becomes 4 times a size of a photosensitive pixel, thereby enhancing a sensitivity of the merged photosensitive pixel. In addition, because noise in the image sensor 21 is mostly random noise, with respect to four photosensitive pixels before being merged, noise may exist in one or two of the four photosensitive pixels. After the four photosensitive pixels are merged into the merged photosensitive pixel, the impact of the noise in the one or two of the four photosensitive pixels on the merged photosensitive pixel is reduced. That is, the noise in the image sensor 21 is reduced, and a signal to noise ratio is increased.

However, at the same time when each four photosensitive pixels become a merged photosensitive pixel, resolution of the merged image 800 is decreased.

In FIGS. 5 and 7, during imaging, when each four photosensitive elements 21211 covered by the same color filter unit 211a are exposed to light sequentially, after image processing, a color block image may be output.

Specifically, the photosensitive element 21211 is configured to convert light into charges. The generated charges are proportional to intensity of the light. The transfer transistor 21212 is configured to control conduction or cutoff of the circuit based on a control signal. When the circuit conducts, the source follower 21213 is configured to convert the charges generated by the photosensitive element 21211 being exposed to light into a voltage signal. The ADC 21214 is configured to convert the voltage signal into a digital signal and output to the control apparatus 10 in FIG. 26 coupled to the image sensor 21 in FIG. 26.

Figure 9:
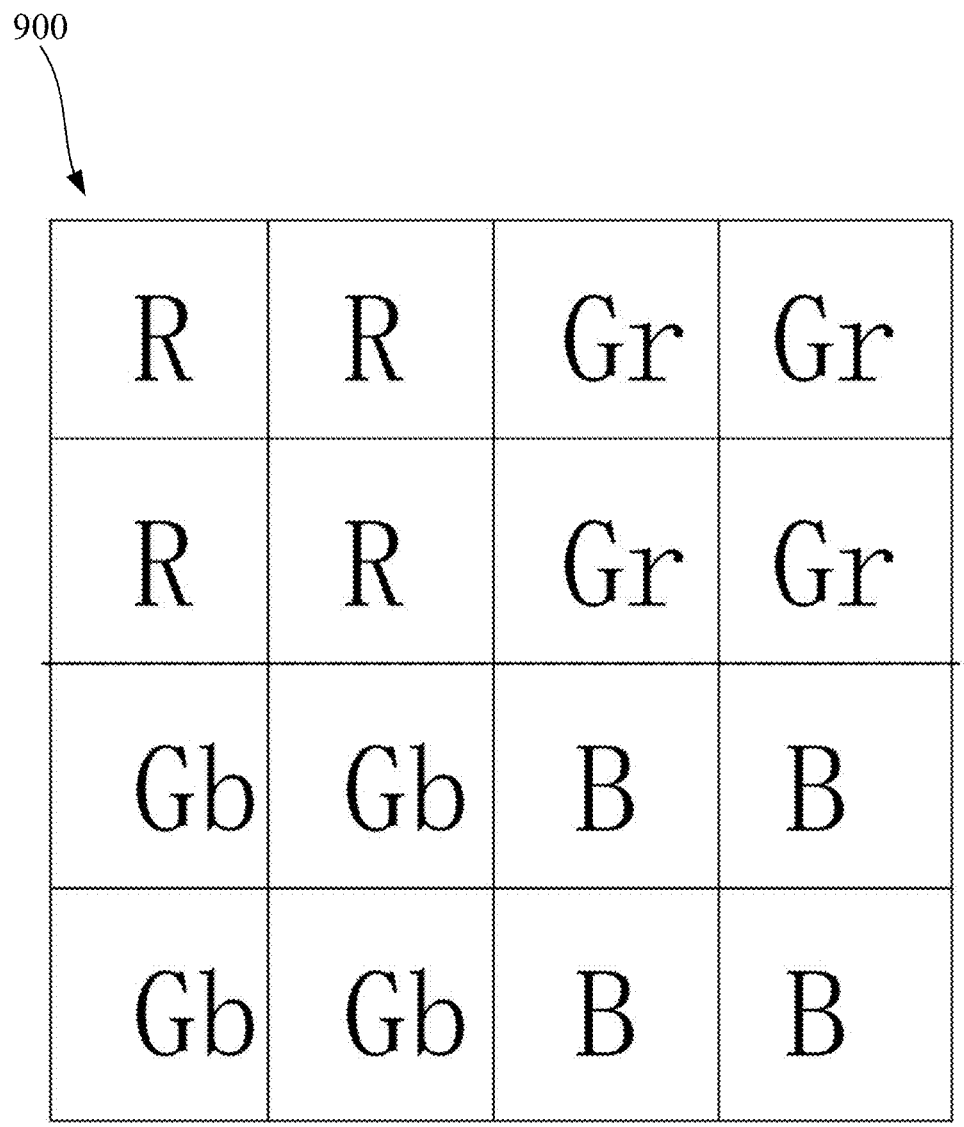
FIG. 9 is a schematic diagram of a state of a color block image in accordance with an embodiment of the present disclosure.

In FIGS. 4 and 9, taking a 16 M image sensor 21 as an example, the image sensor 21 may further keep 16 M of photosensitive pixels for output. That is, the image sensor 21 may output the color block image 900. The color block image 900 includes a plurality of image pixel units. Each of the plurality of image pixel units includes a plurality of original pixels have a same color and arranged in a 2*2 array. A size of each of the plurality of original pixels is same as the size of a corresponding photosensitive pixel. However, because the color filter unit 211a covering each four photosensitive elements 21211 adjacent to each other have a uniform color, although four photosensitive elements 21211 are exposed to light separately, four output original pixels adjacent to each other in each of the plurality of image pixel units have the same color. Therefore, resolution of the color block image 900 cannot be increased.

In accordance with an embodiment of the present disclosure, a control method converts the output color block image into a first imitating image.

It is to be understood that when the merged image is being output, each four photosensitive pixels adjacent to each other having the same color is merged into the merged photosensitive pixel for output. In this manner, each four merged pixels adjacent to each other in the merged image may be regarded as being arranged in a typical Bayer pattern, and therefore the merged image may be received by an image processing module, and directly processed by the image processing module into a true color image. When the color block image is being output, each photosensitive pixel outputs separately. Because each four photosensitive pixels adjacent to each other have the same color, four original pixels adjacent to each other in each of the plurality of image pixel units have the same color, and therefore, the four original pixels may be regarded as being arranged in a non-typical Bayer pattern. The image processing module cannot directly process the non-typical Bayer pattern. That is, when the image sensor 21 uses the same image processing module, for two modes for outputting true color images, i.e., the true color image output under a merged mode, and the true color image output under a color block mode, to be compatible, the color block image needs to be converted into the first imitating image. In other words, each of the plurality of image pixel units having an arrangement of the non-typical Bayer pattern is converted into having an arrangement of the typical Bayer pattern.

The first imitating image includes a plurality of imitating pixels arranged in the Bayer pattern. The plurality of imitating pixels include a current pixel, and the plurality of original pixels of a first image pixel unit of the plurality of image pixel units include a related pixel corresponding to a position of the current pixel.

Figure 10:
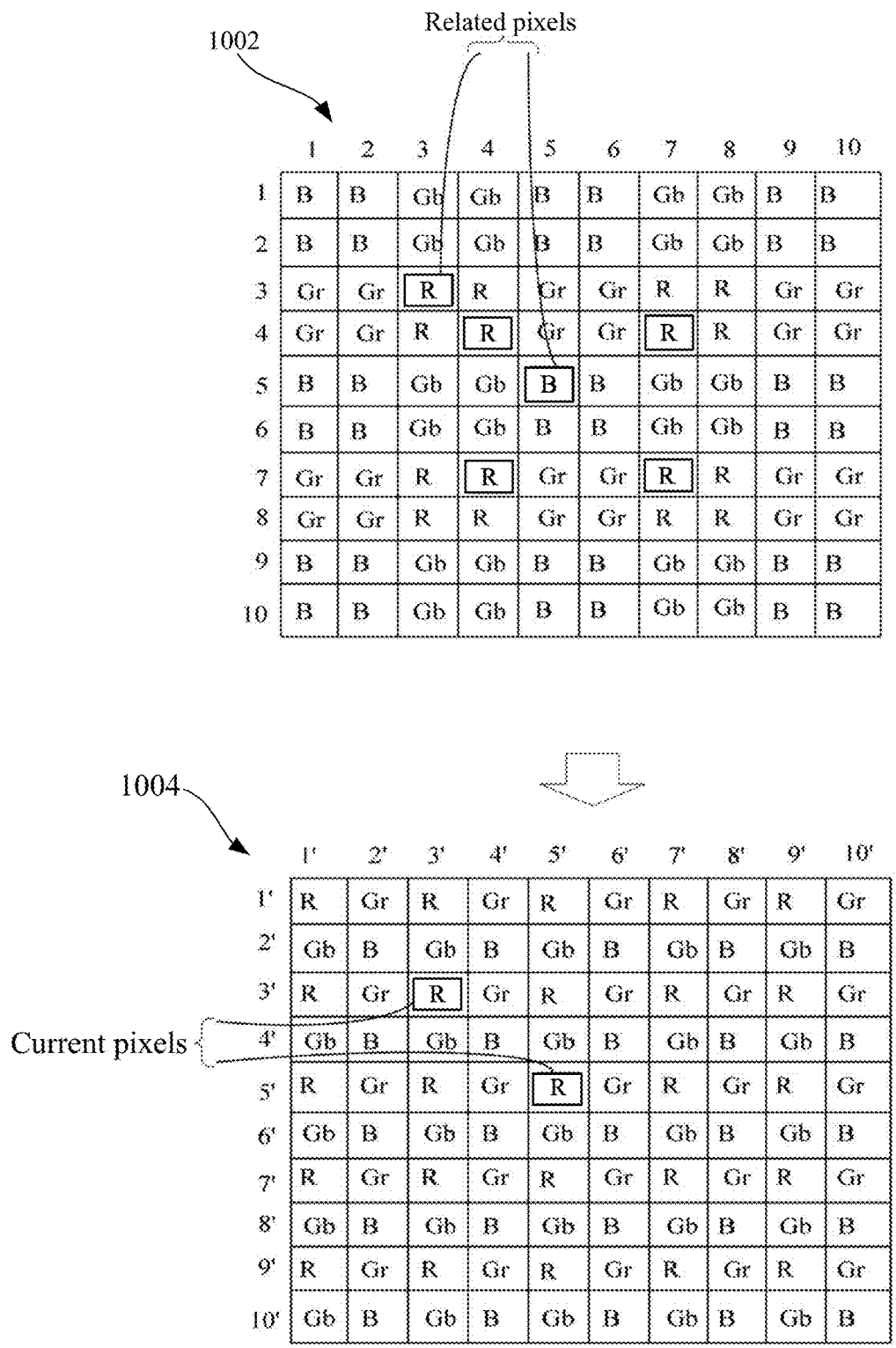
FIG. 10 is a schematic diagram of a state of a color block image and a state of a first imitating image illustrating a control method in accordance with an embodiment of the present disclosure.

Taking FIG. 10 as an example, current pixels are R3'3' and R5'5', in a first imitating image 1004 and corresponding related pixels are R33 and R55 in a color block image 1002.

When obtaining the current pixel R3'3', because the related pixel R33 corresponding to the current pixel R3'3' has a same color as the current pixel R3'3', a pixel value of the related pixel R33 is directly used as a pixel value of the current pixel R3'3'.

When obtaining the current pixel R5'5', because the related pixel R55 corresponding to the current pixel R5'5' has a different color from the current pixel R5'5', a pixel value of the related pixel R55 cannot be directly used as a pixel value of the current pixel R5'5'. A related pixel unit of the current pixel R5'5' need to be used for calculating the pixel value of the current pixel R5'5' through interpolation.

It is to be noted that a pixel value in the description above and below should be broadly considered a color attribute value of a pixel, such as a color value.

The related pixel unit includes a plurality of, such as 4, original pixels in a first set of image pixel units having a same color as the current pixel. The first set of image pixel units neighbor the first image pixel unit.

It is to be noted that a term "neighbor" used herein should be broadly understood. Taking FIG. 10 as an example, the related pixel R55 corresponds to the current pixel R5'5'. The first set of image pixel units neighboring the first image pixel unit that the related pixel R55 belongs to and having the same color as the current pixel R5'5' are image pixel units that pixels R44, R74, R47, R77 belong to and are not other red image pixel units spatially farther away from the first image pixel unit that the related pixel R55 belongs to. Red original pixels spatially closest to the related pixel R55 are the pixels R44, R74, R47, and R77. That is, the related pixel unit of the current pixel R5'5' consists of the pixels R44, R74, R47, and R77. The current pixel R5'5' has the same color as the pixels R44, R74, R47, and R77, and corresponds to the related pixel R55 neighboring the pixels R44, R74, R47, and R77.

In this manner, with respect to different situations for the current pixels, different methods for converting an original pixel into an imitating pixel are used, thereby converting the color block image 1002 into the first imitating image 1004. During taking images, special color filters arranged in the Bayer pattern are used, and therefore, a signal to noise ratio of the images may be increased. During image processing, the color block image 1002 may be processed through interpolation, and therefore, resolution of the images may be increased.

Figure 11:
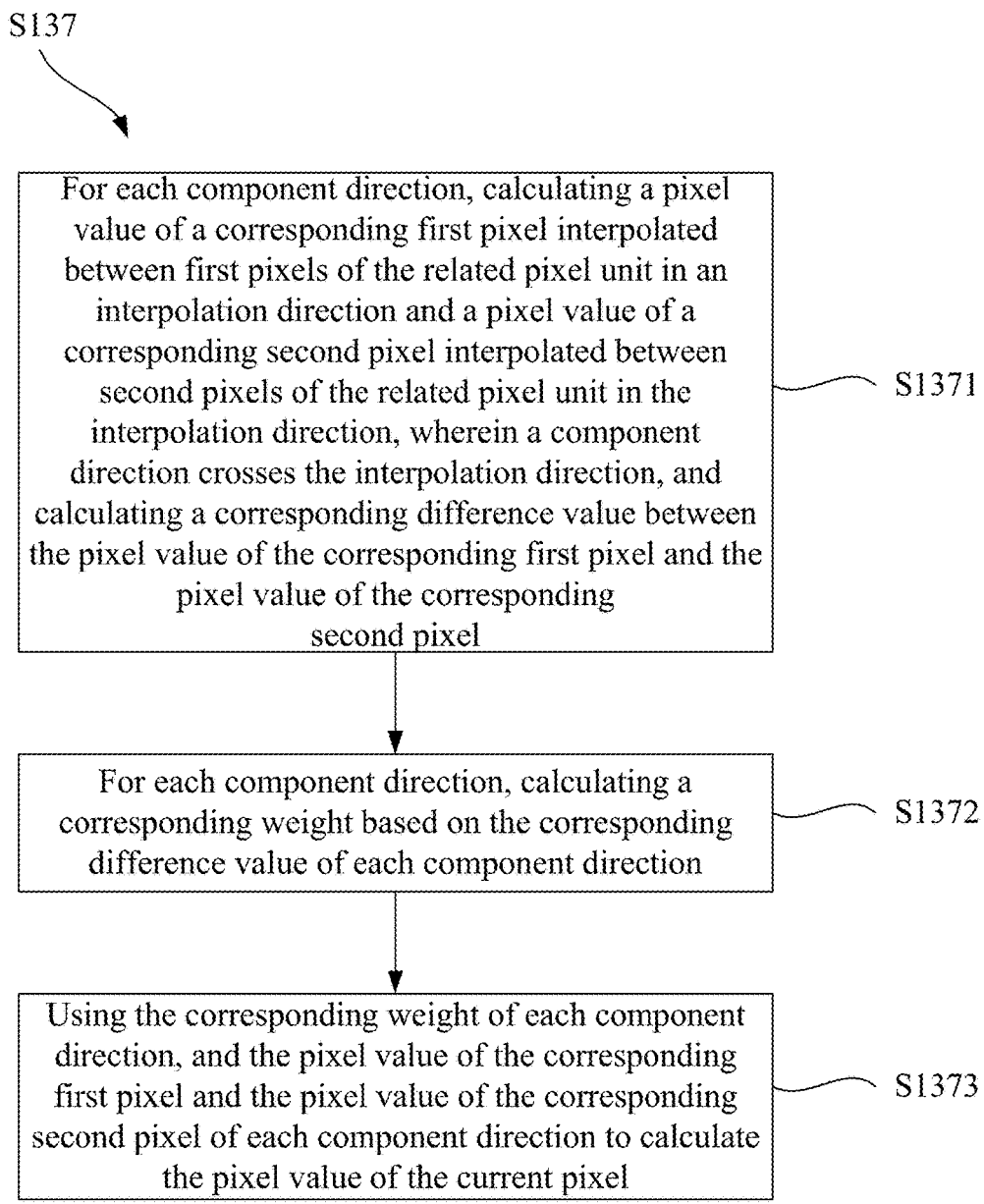
FIG. 11 is a schematic flowchart of an operation of a control method in accordance with an embodiment of the present disclosure.

In FIG. 11, in an embodiment, the block S137 includes following operations.

At block S1371, for each component direction, calculating a pixel value of a corresponding first pixel interpolated between first pixels of the related pixel unit in an interpolation direction and a pixel value of a corresponding second pixel interpolated between second pixels of the related pixel unit in the interpolation direction, wherein a component direction crosses the interpolation direction, and calculating a corresponding difference value between the pixel value of the corresponding first pixel and the pixel value of the corresponding second pixel.

At block S1372, for each component direction, calculating a corresponding weight based on the corresponding difference value of each component direction.

At block S1373, using the corresponding weight of each component direction, and the pixel value of the corresponding first pixel and the pixel value of the corresponding second pixel of each component direction to calculate the pixel value of the current pixel.

Figure 12:
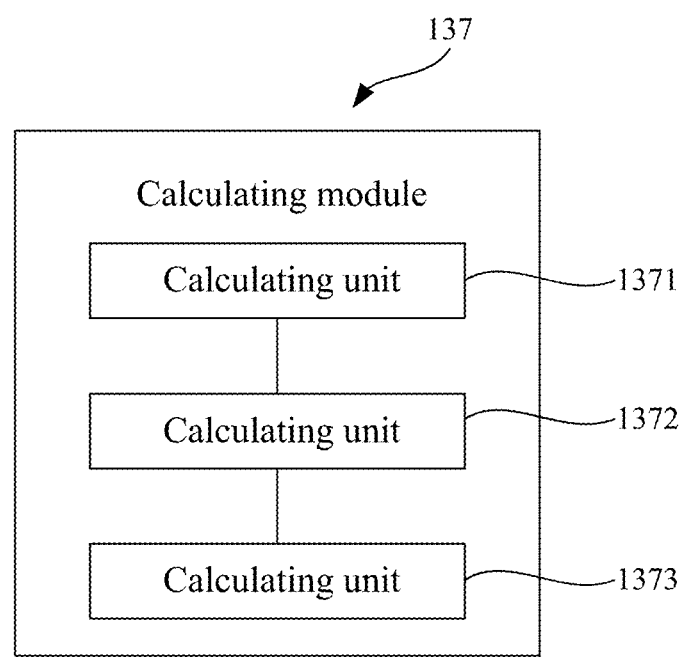
FIG. 12 is a functional block diagram of a calculating module in accordance with an embodiment of the present disclosure.

In FIG. 12, in an embodiment, the calculating module 137 includes a calculating module 1371, a calculating module 1372, and a calculating module 1373. The calculating module 1371 is configured to, for each component direction, calculate a pixel value of a corresponding first pixel interpolated between first pixels of the related pixel unit in an interpolation direction and a pixel value of a corresponding second pixel interpolated between second pixels of the related pixel unit in the interpolation direction, wherein a component direction crosses the interpolation direction. The calculating module 1371 is further configured to calculate a corresponding difference value between the pixel value of the corresponding first pixel and the pixel value of the corresponding second pixel. The calculating module 1372 is configured to, for each component direction, calculate a corresponding weight based on the corresponding difference value of each component direction. The calculating module 1373 is configured to use the corresponding weight of each component direction, and the pixel value of the corresponding first pixel and the pixel value of the corresponding second pixel of each component direction to calculate the pixel value of the current pixel. That is, the block S1371 may be implemented by the calculating module 1371. The block S1372 may be implemented by the calculating module 1372. The block S1373 may be implemented by the calculating module 1373.

Specifically, processing through interpolation considers corresponding energy difference values of an image for the different component directions. Through linear interpolation using the corresponding weights for the different component directions, wherein the corresponding weights are based on corresponding difference values of the related pixel unit in the different component directions, the pixel value of the current pixel is calculated. For a component direction of a smaller energy difference value, a reference weight is larger, which causes a weight used during interpolation to be larger.

In an example, for ease of calculation, only horizontal and vertical directions are considered.

The pixel value of the current pixel R5'5' is obtained through interpolation using pixel values of the pixels R44, R74, R47, and R77. Because original pixels having a same color as the current pixel R5'5' in horizontal and vertical component directions do not exist, interpolated pixel values in the horizontal and vertical component directions are calculated using the related pixel unit. For the horizontal component direction, a pixel value of a first pixel R45 interpolated between first pixels R44 and R47 of the related pixel unit in a vertical interpolation direction and a pixel value of a second pixel R75 interpolated between second pixels R74 and R77 of the related pixel unit in the vertical interpolation direction are calculated. For the vertical component direction, a pixel value of a first pixel R54 interpolated between first pixels R44 and R74 of the related pixel unit in a horizontal interpolation direction and a pixel value of a second pixel R57 interpolated between second pixels R47 and R77 of the related pixel unit in the horizontal interpolation direction are calculated.

Specifically, $R45=R44*\frac{2}{3}+R47*\frac{1}{3}$, $R75=\frac{2}{3}*R74+\frac{1}{3}*R77$, $R54=\frac{2}{3}*R44+\frac{1}{3}*R74$, and $R57=\frac{2}{3}*R47+\frac{1}{3}*R77$. For convenience, herein, pixel values of pixels such as the pixels R44, R45, R47, R54, R57, R74, R75, and R77 are represented by the same symbols as those of the pixels.

For each of the horizontal and vertical component directions, a corresponding difference value and a corresponding weight are calculated. That is, based on the corresponding difference value of the color for each of the horizontal and vertical component directions, a corresponding weight referenced during interpolation is determined. For a component direction of a smaller difference value, a weight is larger, and for a component direction of a larger difference value, a weight is smaller. Specifically, for the horizontal component direction, a difference value X1 between the pixel value of the first pixel R45 and the pixel value of the second pixel R75 is calculated by X1=|R45−R75|. For the vertical component direction, a difference value X2 between the pixel value of the first pixel R54 and the pixel value of the second pixel R75 is calculated by X2=|R54−R57|. For the horizontal component direction, a weight W2 is calculated by W2=X2/(X1+X2). For the vertical component direction, a weight W1 is calculated by W1=X1/(X1+X2).

Then, through linear interpolation using corresponding weights W2 and W1 for the horizontal and vertical component directions, the pixel value of the current pixel R5'5' is calculated by R5'5'=(⅔*R45+⅓*R75)*W2+(⅔*R54+⅓*R57)*W1. It is to be understood that if the difference value X1 is larger than the difference value X2, then the weight W1 is larger than the weight W2. Therefore, the weight for the horizontal component direction is the weight W2, and the weight for the vertical interpolation direction is the weight W1, and vice versa.

In this manner, the pixel value of the current pixel may be calculated through interpolation. Based on the above control method, the plurality of original pixels of each image pixel unit may be converted into imitating pixels arranged in the typical Bayer pattern. That is, four imitating pixels adjacent to each other and arranged in a 2*2 array include a red imitating pixel, two green imitating pixels, and a blue imitating pixel.

It is to be noted that interpolation includes but is not limited to the manner in which only pixel values of a same color for the vertical and horizontal directions are considered during calculation as in the present embodiment. Pixel values of other colors may, for example, be further considered.

Figure 13:
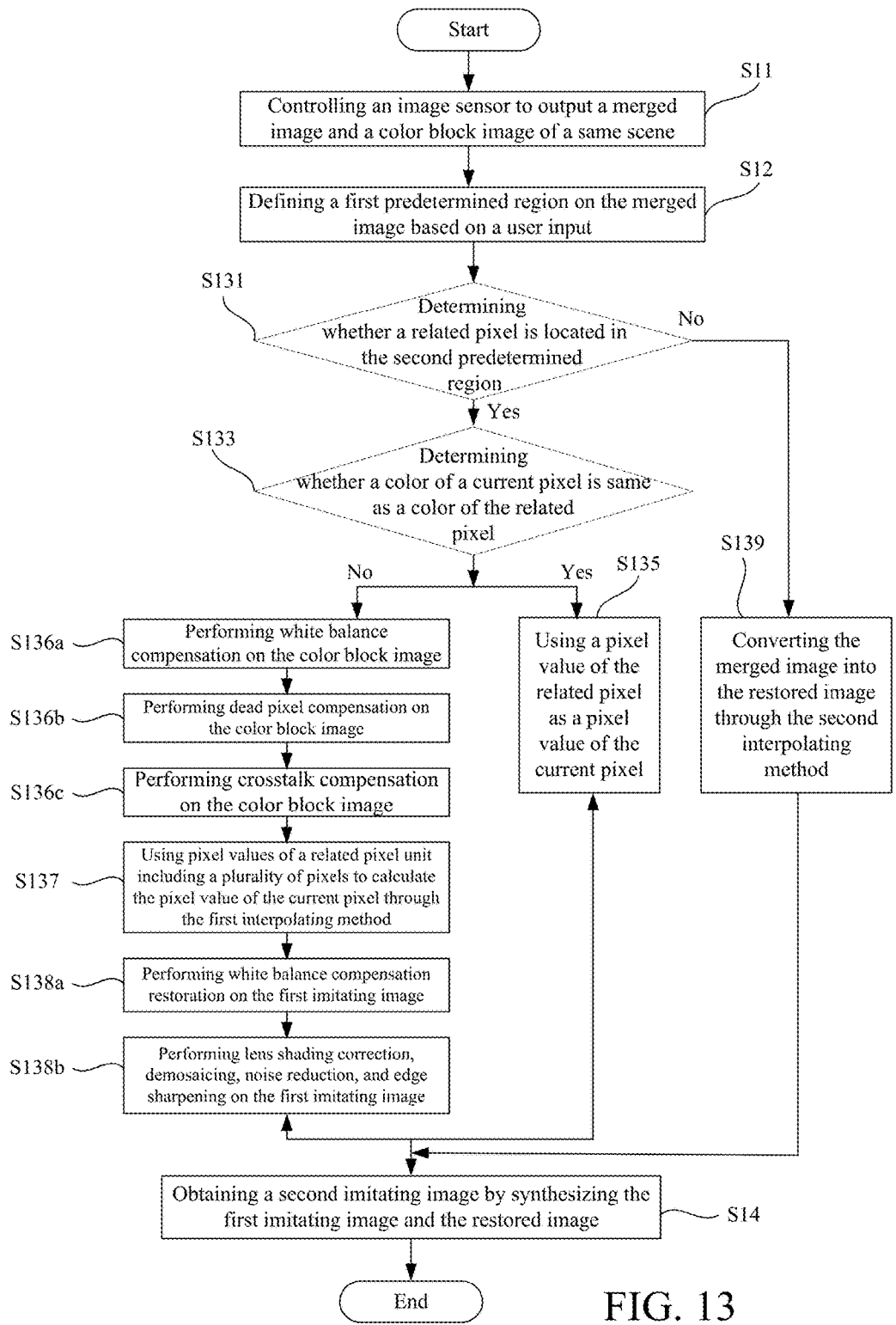
FIG. 13 is a schematic flowchart of a control method in accordance with an embodiment of the present disclosure.

In FIG. 13, in an embodiment, before block S137, the control method further includes the following operation.

At block S136a, performing white balance compensation on the color block image.

After block S137, the control method further includes the following operation.

At block S138a, performing white balance compensation restoration on the first imitating image.

Figure 14:
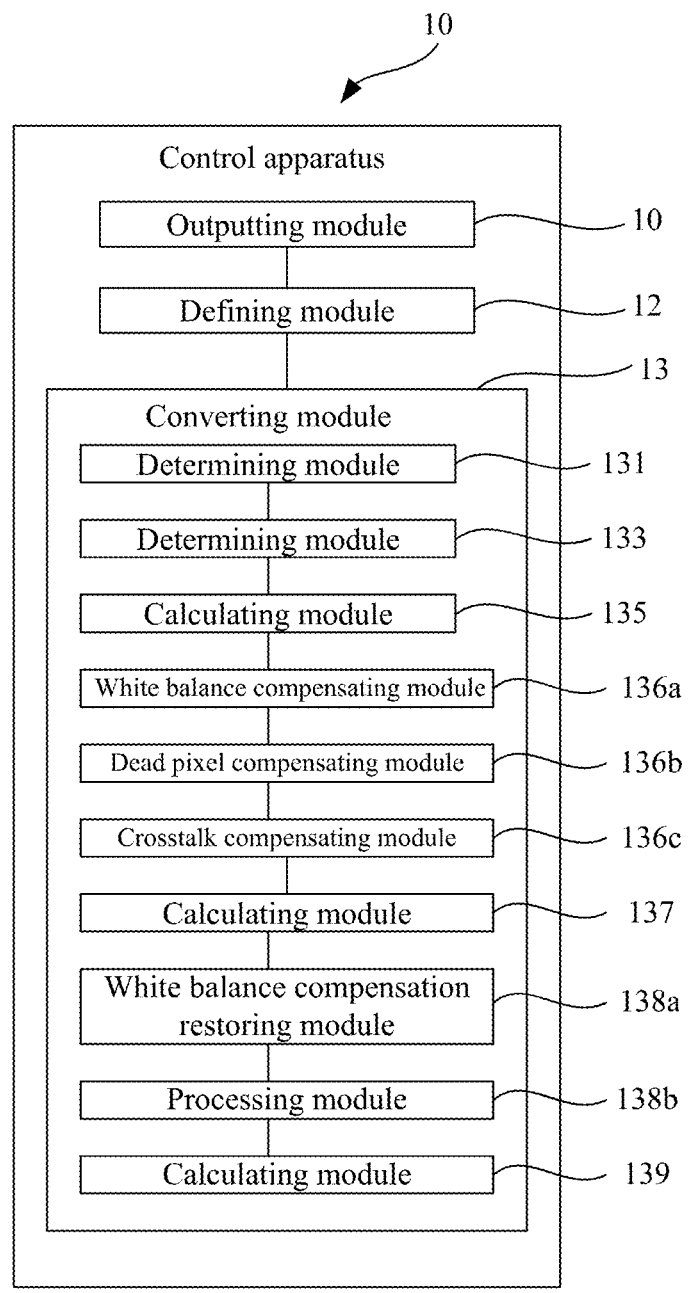
FIG. 14 is a schematic functional block diagram of a control apparatus in accordance with an embodiment of the present disclosure.

In FIG. 14, in an embodiment, the converting module 13 further includes a white balance compensating module 136a and a white balance compensation restoring module 138a. The block S136a may be implemented by the white balance compensating module 136a. The block S138a may be implemented by the white balance compensation restoring module 138a. That is, the white balance compensating module 136a is configured to perform white balance compensation on the color block image. The white balance compensation restoring module 138a is configured to perform white balance compensation restoration on the first imitating image.

Specifically, in an example, during interpolation during converting the color block image into the first imitating image, red and blue imitating pixels not only refer to colors of original pixels of corresponding same color channels, but also refer to color weights of original pixels of a green channel. Therefore, before interpolation, white balance compensation needs to be performed, so as to eliminate the effect of white balance compensation on interpolation. In order not to break white balance of the color block image, after interpolation, white balance compensation restoration needs to be performed on the first imitating image. Restoration is performed based on red, green, and blue gain values during compensation.

In this manner, the effect of white balance is eliminated during interpolation, and white balance of the color block image can be kept for the first imitating image after interpolation.

In FIG. 13, in an embodiment, before block S137, the control method further includes the following operation.

At block S136b, performing dead pixel compensation on the color block image.

In FIG. 14, in an embodiment, the control apparatus 10 further includes a dead pixel compensating module 136b. The dead pixel compensating module 136b is configured to perform dead pixel compensation on the color block image. That is, the block S136b may be implemented by the dead pixel compensating module 136b.

It is to be understood that limited by a manufacturing process, dead pixels may exist in the image sensor 21. The dead pixels usually do not change with sensitivity and always exhibit same pixel values. The presence of the dead pixels affects image quality. Therefore, in order to ensure interpolation to be accurate and not affected by the dead pixels, dead pixel compensation needs to be performed before interpolation.

Specifically, during dead pixel compensation, detection may be performed on original pixels, and when a certain original pixel is detected as a dead pixel, dead pixel compensation may be performed based on pixel values of other original pixels in the image pixel unit that the certain original pixel belongs to.

In this manner, the impact of the dead pixels on interpolation may be eliminated, thereby increasing image quality.

In FIG. 13, in an embodiment, before block S137, the control method further includes the following operation.

At block S136c, performing crosstalk compensation on the color block image.

In FIG. 14, in an embodiment, the control apparatus 10 further includes a crosstalk compensating module 136c. The crosstalk compensating module 136c is configured to perform crosstalk compensation on the color block image. That is, the block S136c may be implemented by the crosstalk compensating module 136c.

Specifically, four photosensitive pixels in a photosensitive pixel unit are covered by color filters having a same color. Sensitivity differences may exist among the photosensitive pixels, such that fixed pattern noise exists in a solid color region in a true color image converted from the first imitating image, thereby affecting image quality. Hence, crosstalk compensation needs to be performed on the color block image.

In FIG. 13, in an embodiment, after block S137, the control method further includes the following operation.

At block S138b, performing lens shading correction, demosaicing, noise reduction, and edge sharpening on the first imitating image.

In FIG. 14, in an embodiment, the control apparatus 10 further includes a processing module 138b. The processing module 138b is configured to perform lens shading correction, demosaicing, noise reduction, and edge sharpening on the first imitating image. That is, the block S138b may be implemented by the processing module 138b.

It is to be understood that after the color block image is converted into the first imitating image which is arranged in the typical Bayer pattern, the processing module 138b may be used to process the first imitating image. The processing process performed by the processing module 138b includes lens shading correction, demosaicing, noise reduction, and edge sharpening. After processing, a true color block image may be obtained and output to the user.

Figure 15:
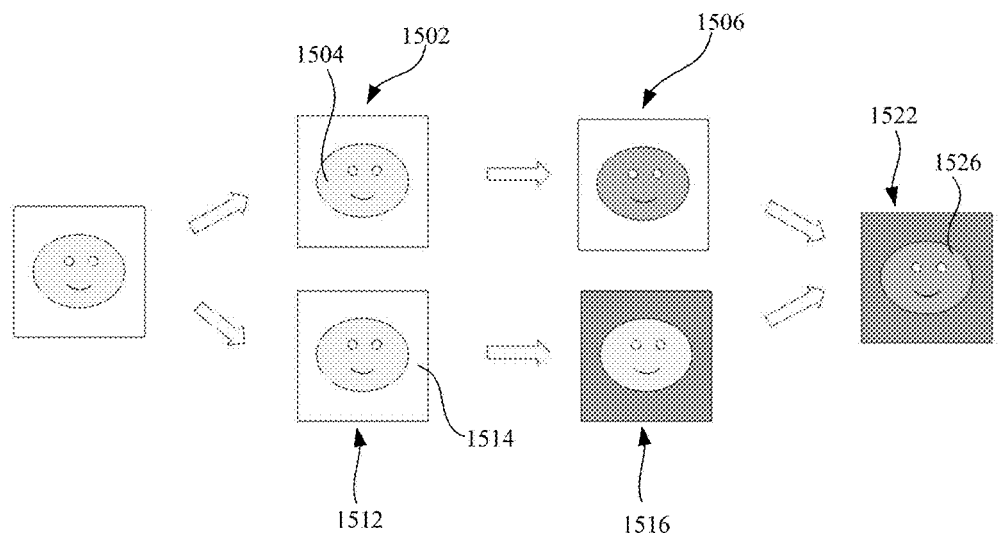
FIG. 15 is a schematic diagram of states illustrating synthesis of images in accordance with an embodiment of the present disclosure.

Taking FIG. 8 as an example, the image sensor 21 merges 16 M of photosensitive pixels into 4 M of merged photosensitive pixels for outputting the merged image 800. In order to facilitate subsequent synthesis of the color block image and the merged image, the merged image needs to be enlarged by stretching so as to be converted into the restored image of a same size as the color block image. In FIG. 15, the first interpolating method is applied to the second predetermined region 1504 in the color block image 1502 to obtain the first imitating image 1506. The second predetermined region 1504 corresponds to the first predetermined region 2008 to be described with reference to FIG. 20. The second interpolating method is applied to the third predetermined region 1514 in the merged image 1512 to obtain the restored image 1516. The third predetermined region 1514 corresponds to the first region 2010 in FIG. 20 outside the first predetermined region 2008. The images 1506 and 1516 are synthesized into the second imitating image 1522. A fourth predetermined region 1526 in the second imitating image 1522 has higher resolution. The fourth predetermined region 1526 corresponds to the first predetermined region 2008.

Figure 16:
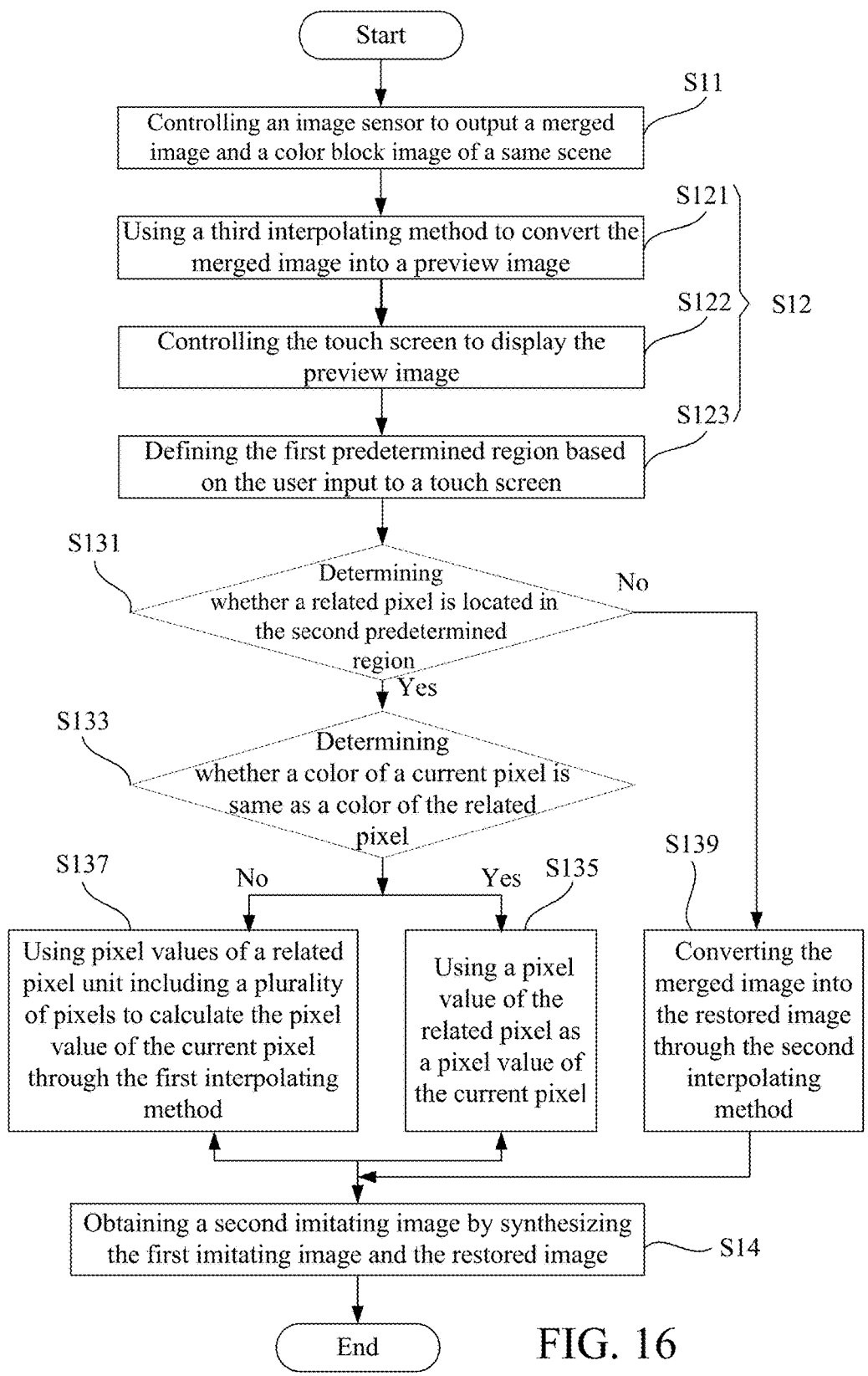
FIG. 16 is a schematic flowchart of a control method in accordance with an embodiment of the present disclosure.

In FIG. 16, in an embodiment, the electronic apparatus further includes a touch screen. The block S12 includes the following operations.

At block S121, using a third interpolating method to convert the merged image into a preview image.

At block S122, controlling the touch screen to display the preview image.

At block S123, defining the first predetermined region based on the user input to the touch screen.

Figure 17:
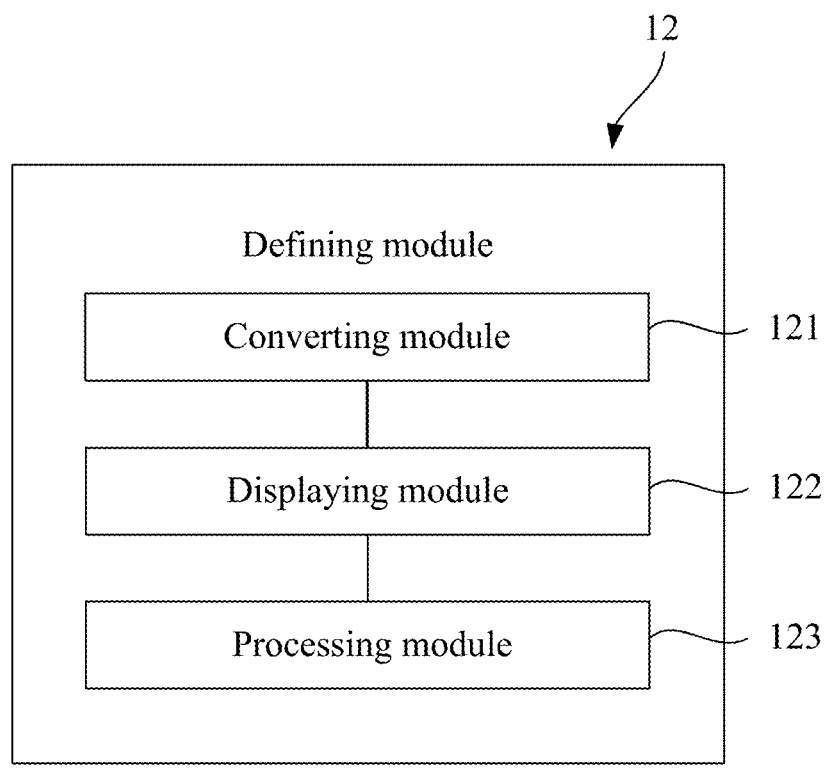
FIG. 17 is a functional block diagram of a defining module in accordance with an embodiment of the present disclosure.

In FIG. 26, the electronic apparatus 10 further includes a touch screen 30. In FIG. 17, in an embodiment, the defining module 12 includes a converting module 121, a displaying module 122, and processing module 123. The converting module 121 is configured to use a third interpolating method to convert the merged image into a preview image. The displaying module 122 is configured to control the touch screen to display the preview image. The processing module 123 is configured to define the first predetermined region based on the user input to the touch screen.

That is, the block S121 may be implemented by the converting module 121. The block S122 may be implemented by the displaying module 122. The block S123 may be implemented by the processing module 123.

It is to be understood that the user selects in the preview image so that the first predetermined region may be defined. The converting module 121 converts the merged image into the preview image. The displaying module 122 displays the preview image. The third interpolating method is used to convert the merged image into the preview image. The third interpolating method includes the second interpolating method and a bilinear interpolation method. During conversion, first, the second interpolating method is used to convert the merged image into a restored image, and then, the bilinear interpolation method is used to convert the restored image into a true color image, i.e. the preview image. In this manner, the user may preview the preview image, and selects in the preview image so that the first predetermined region may be defined.

It is to be noted that, the restored image is not limited to be converted into the true color image using the bilinear interpolation method. Other interpolating methods may alternatively be used.

Figure 18:
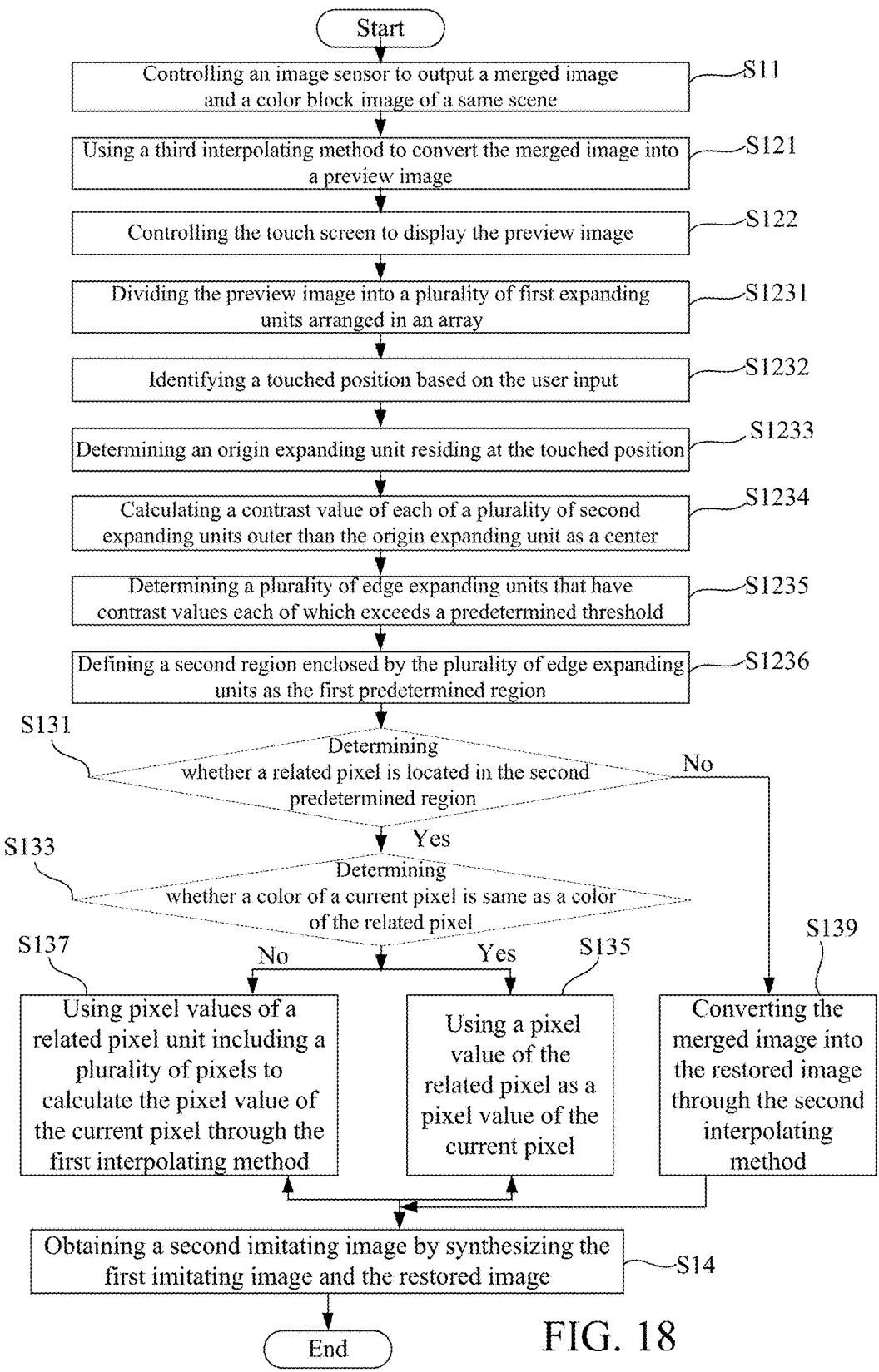
FIG. 18 is a schematic flowchart of a control method in accordance with an embodiment of the present disclosure.

In FIG. 18, in an embodiment, the block S123 includes the following operations.

At block S1231, dividing the preview image into a plurality of first expanding units arranged in an array.

At block S1232, identifying a touched position based on the user input.

At block S1233, determining an origin expanding unit residing at the touched position. The plurality of first expanding units include the origin expanding unit.

At block S1234, calculating a contrast value of each of a plurality of second expanding units outer than the origin expanding unit as a center. The plurality of first expanding units further include the plurality of second expanding units.

At block S1235, determining a plurality of edge expanding units that have contrast values each of which exceeds a predetermined threshold. The plurality of second expanding units include the plurality of edge expanding units.

At block S1236, defining a second region enclosed by the plurality of edge expanding units as the first predetermined region.

Figure 19:
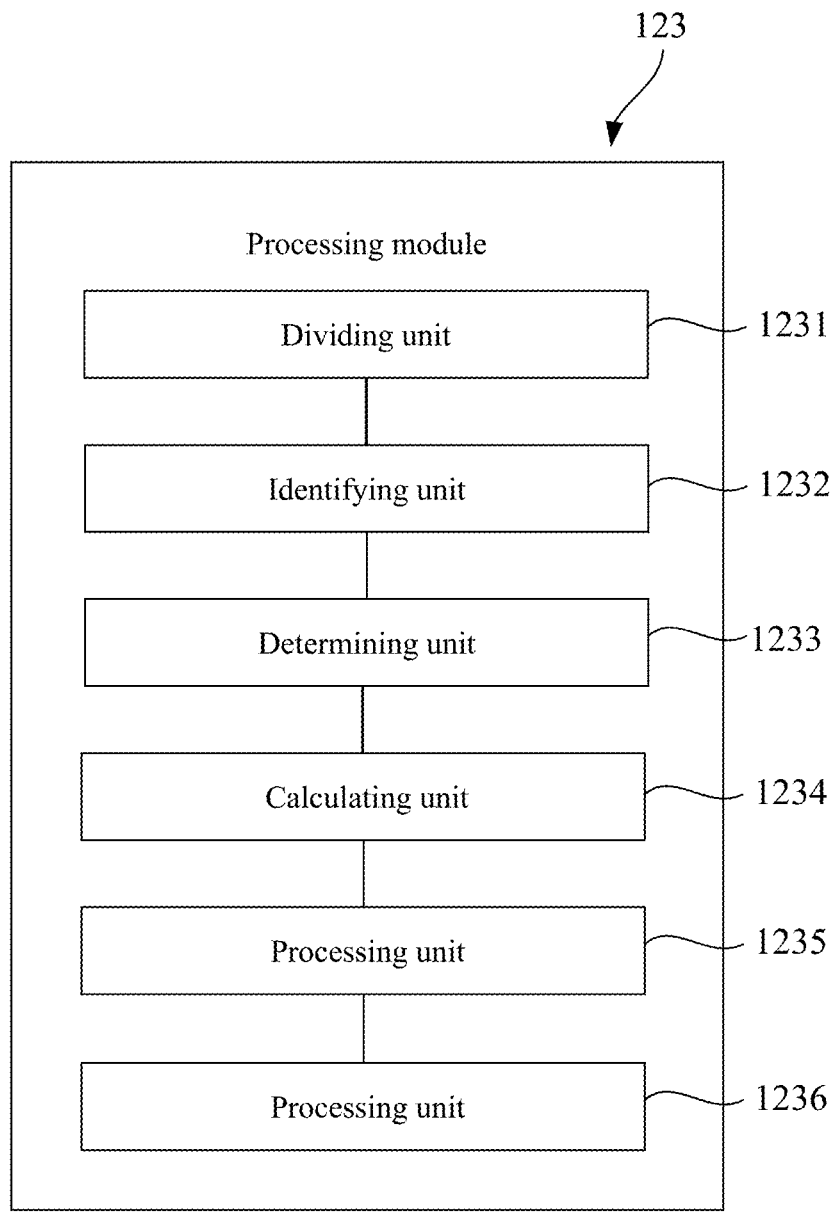
FIG. 19 is a functional block diagram of a processing module in accordance with an embodiment of the present disclosure.

In FIG. 19, in an embodiment, the processing module 123 includes a dividing unit 1231, an identifying unit 1232, a determining unit 1233, a calculating unit 1234, a processing unit 1235, and a processing unit 1236. The dividing unit 1231 is configured to divide the preview image into a plurality of first expanding units arranged in an array. The identifying unit 1232 is configured to identify a touched position based on the user input. The determining unit 1233 is configured to determine an origin expanding unit residing at the touched position. The plurality of first expanding units include the origin expanding unit. The calculating unit 1234 is configured to calculate a contrast value of each of a plurality of second expanding units outer than the origin expanding unit as a center. The plurality of first expanding units further include the plurality of second expanding units. The processing unit 1235 is configured to determine a plurality of edge expanding units that have contrast values each of which exceeds a predetermined threshold. The plurality of second expanding units include the plurality of edge expanding units. The processing unit 1236 is configured to define a second region enclosed by the plurality of edge expanding units as the first predetermined region.

That is, the block S1231 may be implemented by the dividing unit 1231. The block S1232 may be implemented by the identifying unit 1232. The block S1233 may be implemented by the determining unit 1233. The block S1234 may be implemented by the calculating unit 1234. The block S1235 may be implemented by the processing unit 1235. The block S1236 may be implemented by the processing unit 1236.

Figure 20:
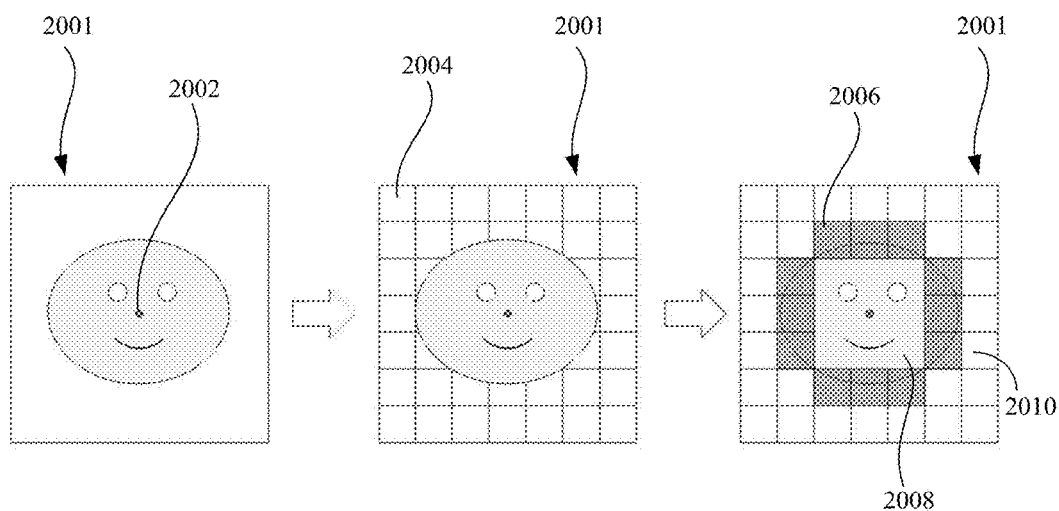
FIG. 20 is a schematic diagram of states illustrating the control method in accordance with an embodiment of the present disclosure.

Specifically, taking FIG. 20 as an example, a black dot in the preview image 2001 is the touched position 2002. The preview image 2001 is divided into the plurality of first expanding units 2004. Each square is one of the plurality of first expanding units 2004. The origin expanding unit residing at the touched position 2002 is determined. The plurality of first expanding units 2004 include the origin expanding unit. The contrast value of each of the plurality of second expanding units outer than the origin expanding unit as the center is calculated. The plurality of first expanding units 2004 further include the plurality of second expanding units. The plurality of edge expanding units 2006 that have contrast values each of which exceeds the predetermined threshold are determined. The plurality of second expanding units include the plurality of edge expanding units 2006. In FIG. 19, the plurality of edge portion units 2006 correspond to an edge portion of a human face and are shown as gray squares. In this manner, the second region enclosed by the plurality of edge expanding units 2006 is defined as the first predetermined region 2008. The first predetermined region 2008 is indicated by the user as a main part that the user is concerned about and is processed by the first interpolating method, thereby increasing resolution of the main part and enhancing a user experience.

Figure 21:
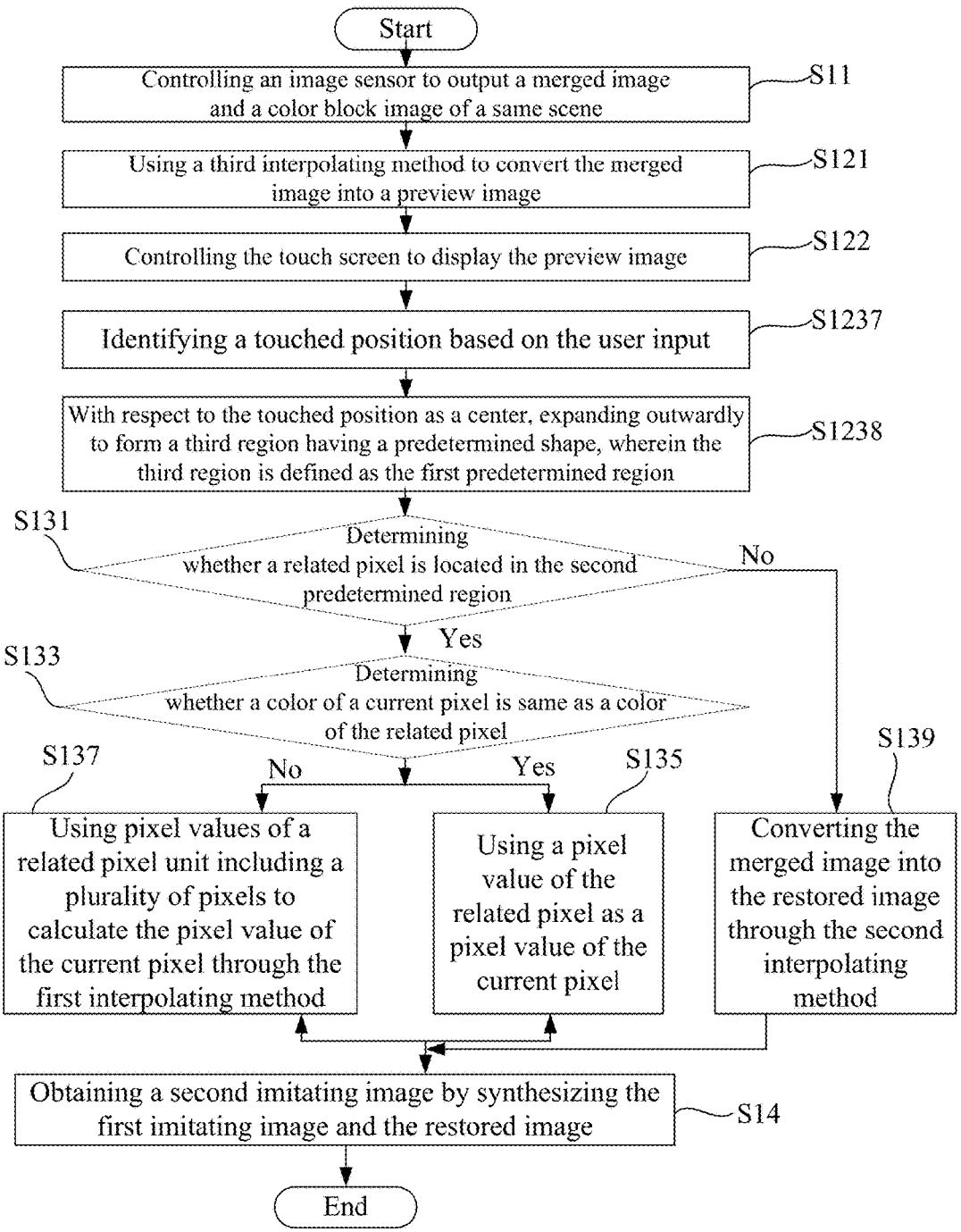
FIG. 21 is schematic flowchart of a control method in accordance with an embodiment of the present disclosure.

In FIG. 21, in an embodiment, the block S123 includes the following operations.

At block S1237, identifying a touched position based on the user input.

At block S1238, with respect to the touched position as a center, expanding outwardly to form a third region having a predetermined shape, wherein the third region is defined as the first predetermined region.

Figure 22:
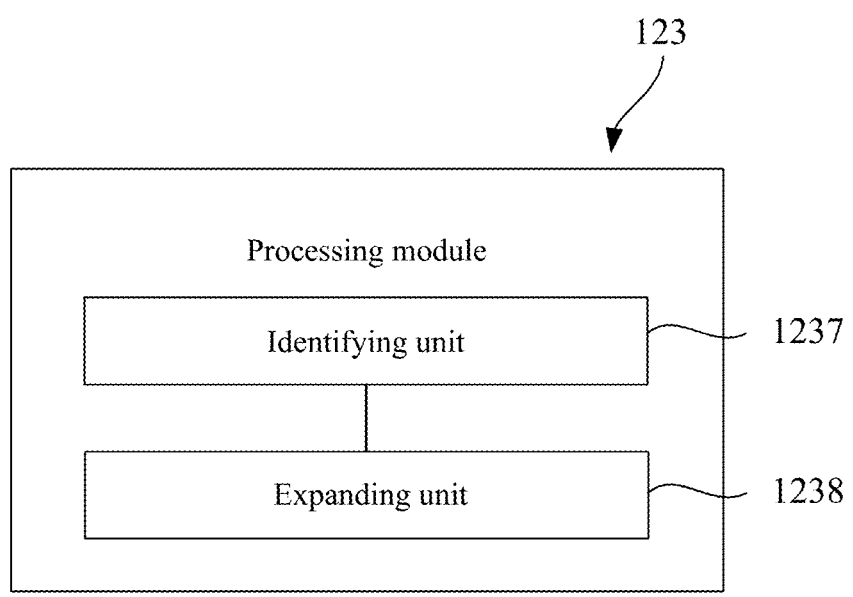
FIG. 22 is a functional block diagram of a processing module in accordance with an embodiment of the present disclosure.

In FIG. 22, in an embodiment, the processing module 123 includes an identifying unit 1237, and an expanding unit 1238. The identifying unit 1237 is configured to identify a touched position based on the user input. The expanding unit 1238 is configured to, with respect to the touched position as a center, expand outwardly to form a third region having a predetermined shape as the first predetermined region.

That is, the block S1237 may be implemented by the identifying unit 1237. The block S1238 may be implemented by the expanding unit 1238.

Figure 23:
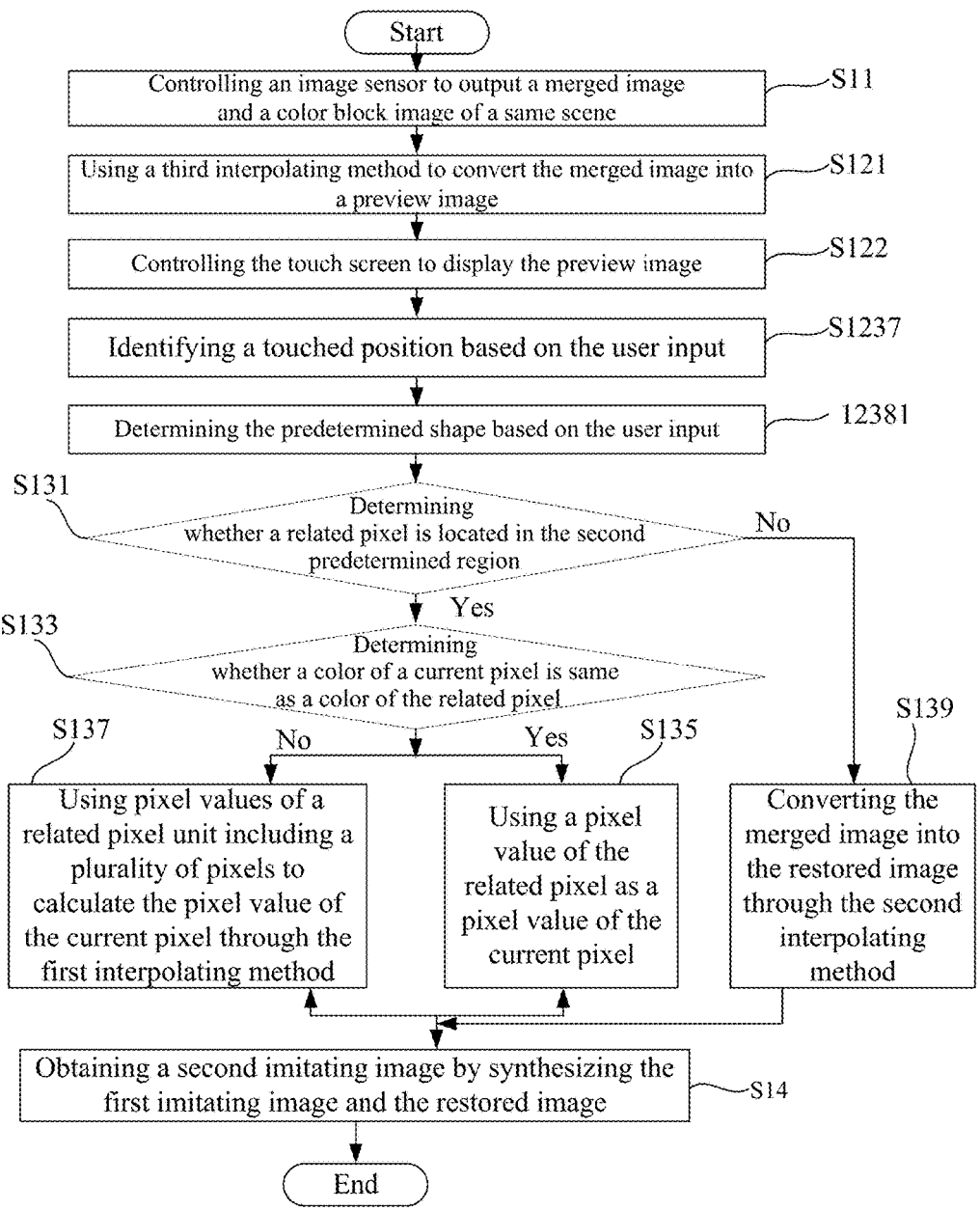
FIG. 23 is schematic flowchart of a control method in accordance with an embodiment of the present disclosure.

In FIG. 23, in an embodiment, the block S1238 includes the following operations.

At block S12381, determining the predetermined shape based on the user input.

Figure 24:
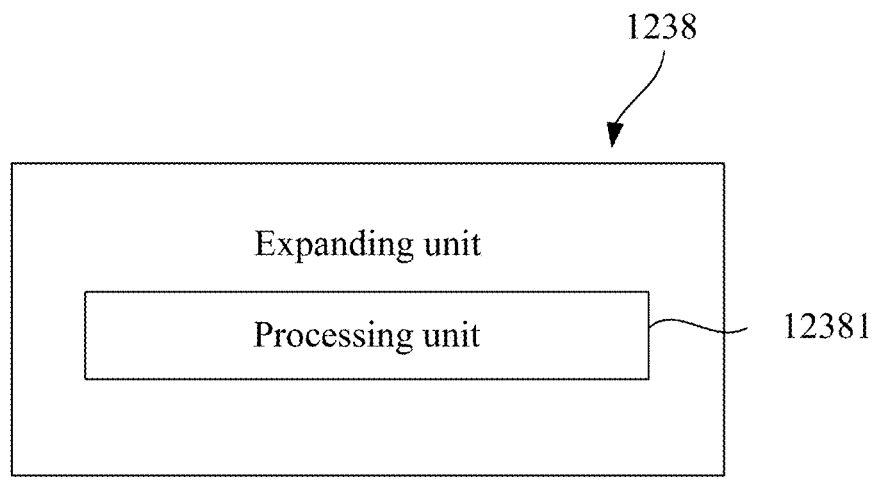
FIG. 24 is a functional block diagram of an expanding unit in accordance with an embodiment of the present disclosure.

In FIG. 24, in an embodiment, the expanding unit 1238 includes a processing unit 12381. The processing unit 12381 is configured to determine the predetermined shape based on the user input.

That is, the block S12381 may be implemented by the processing unit 12381.

Figure 25:
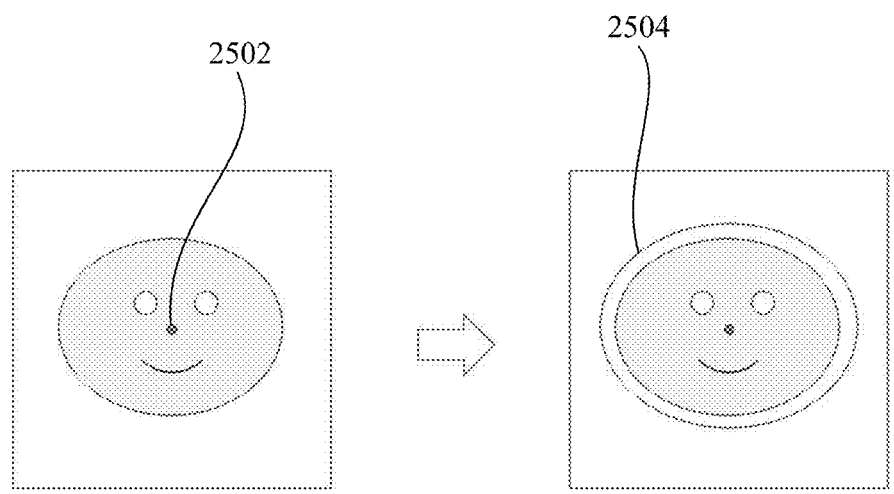
FIG. 25 is a schematic diagram of states illustrating the control method in accordance with an embodiment of the present disclosure.

Specifically, taking FIG. 25 as an example, a black dot is the touched position 2502. The third region having a circular shape is formed by expanding outwardly with respect to the touched position 2502 as the center. The third region having the circular shape is defined as the first predetermined region 2504. In FIG. 25, the first predetermined region 2504 includes an entire human face. The first interpolating method may be applied to the human face to increase resolution of the human face.

It is to be noted that, in another embodiment, the predetermined shape may be a rectangle, a square, or other shapes. The user may adjust a size of the first predetermined region 2504 and drag to move the first predetermined region 2504 based on actual needs. Furthermore, defining the first predetermined region based on the user input to the touch screen includes the user directly draws a fourth region having an arbitrary shape, wherein the fourth region is defined as the first predetermined region. Alternatively, the user indicates a few points on the touch screen, the few points are connected by lines, and a fifth region enclosed by the connected lines is defined as the first predetermined region. The first interpolating method is applied to the first predetermined region. In this manner, resolution of a main part that the user indicates as of concern is increased, thereby enhancing a user experience.

In FIG. 26, in an embodiment, an electronic apparatus 100 includes a control apparatus 10, a touch screen 30, and a camera module 20.

In an embodiment, the electronic apparatus 100 may be a cell phone, a tablet computer, and the like.

Each of the cell phone and the tablet computer is equipped with a camera module, i.e. the camera module 20. When a user uses the cell phone or the tablet computer to take an image, the control method of any embodiment of the present disclosure may be employed to obtain an image of high resolution.

It is to be noted that the electronic apparatus 100 may be other electronic apparatuses having image taking functions. The control method of any embodiment of the present disclosure may correspond to one of image processing modes of the electronic apparatus 100. That is, when the user uses the electronic apparatus 100 to take an image, the user needs to select from the image processing modes. When the user selects the image processing mode corresponding to the control method of any embodiment of the present disclosure, the user may indicate the first predetermined region and the electronic apparatus 100 may use the control method of any embodiment of the present disclosure to perform image processing.

In an embodiment, the camera module 20 includes a front camera and a back camera. Each of the front camera and the back camera may be used in the control method of any embodiment of the present disclosure to enhance a user experience.

In the description of the present disclosure, it is to be appreciated that orientation or location relationships indicated by terms such as "central", "longitudinal", "lateral", "length", "width", "thickness", "up", "down", "front", "back", "left", "right", "vertical", "horizontal", "top", "bottom", "inner", "outer", "clockwise", and "counterclockwise" and are based on orientation or location relationships illustrated in the accompanying drawings. The terms are only used to facilitate the description of the present disclosure and to simplify the description, not used to indicate or imply the relevant device or element must have a particular orientation or must be structured and operate under the particular orientation and therefore cannot be considered as limitations to the present disclosure.

In addition, the terms "first" and "second" are only used for description purpose, and cannot be considered as indicating or implying relative importance or implicitly pointing out the number of relevant technical features. Thus, features being correspondingly defined as "first" and "second" may each expressly or implicitly include at least one of the features. In the description of the present disclosure, the meaning of "a plurality of" is at least two, such as two and three, unless otherwise definitely and specifically defined.

In the present disclosure, unless otherwise definitely specified and defined, a first feature being "above" or "below" a second feature may include the first feature directly in contact with the second feature, and may also include the first feature not directly in contact with and the second feature but through an intervening feature. Further, the first feature being "above", "over", and "beyond" the second feature may include the first feature being "directly above" and "obliquely above" the second feature, or only represents a level of the first feature is higher than a level of the second feature. The first feature being "below", "under", and "beneath" the second feature may include the first feature being "directly below" and "obliquely below" the second feature, or only represents a level of the first feature is lower than a level of the second feature.

The above description provides various embodiments or examples for implementing various structures of the present disclosure. To simplify the description of the present disclosure, parts and configurations of specific examples are described above. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the configurations. Furthermore, the present disclosure provides specific examples of various processes and materials; however, applications of other processes and/or other materials may be appreciated by those skilled in the art.

In the description of the present specification, reference terms "an embodiment", "some embodiments", "an illustrative embodiment", "an example", "a specific example", "some examples", and so on mean that specific features, structures, materials, or characteristics described in conjunction with the embodiments or examples are included in at least one of the embodiments or the examples. In the present specification, the illustrative description of the above-mentioned terms is not limited to the same embodiment or example. Moreover, the described specific features, structures, materials, or characteristics may be combined in a proper way in any one or more of the embodiments or examples.

Any process or method provided in the flowcharts or described by other ways may be appreciated to represent that one or more code modules, code fragments or code parts of executable instructions for implementing specific logical functions or process operations are included. Moreover, the scope of the preferred embodiments of the present disclosure includes other implementations, such as those not in the sequence illustrated or discussed and including functions executed at the same time or in reverse order based on involved functions. These should be appreciated by those skilled in the art to which the present disclosure pertains.

Any logical function and/or operation represented by the flowcharts or described by other ways may, for example, be considered a sequence table of executable instructions for implementing logical function, and may be specifically implemented in computer-readable media for being used by instruction-executing systems, apparatuses or devices (such as computer-based systems, systems including a processing module, or other systems that may retrieve instructions from the instruction-executing systems, apparatuses or devices, and execute the instructions), or used by any combination of the instruction-executing systems, apparatuses or devices. With respect to the present specification, "computer-readable media" may be non-transitory media that may include stored, communicated, propagated or transmitted programs for being used by the instruction-executing systems, apparatuses or devices or used by any combination of the instruction-executing systems, apparatuses or devices. Specific examples (a non-exhaustive list) of the computer-readable media include the following: electrical connecting components (electronic devices) having one or more wirings, portable computer discs or cartridges (magnetic devices), random access memories (RAMs), read-only memories (ROMs), erasable and programmable read-only memories (EPROMs or flash memories), fiber optic devices, and portable optical compact disc read-only memories (CDROMs). Moreover, the computer-readable media may even be papers or other suitable media on which the programs are printed. The papers or the other suitable media may be, for example, optically scanned, and then edited, interpreted, or, if necessary, processed by other suitable ways to electronically obtain the programs, which are then stored in memories of computers.

It should be understood that various parts of the embodiments of the present disclosure may be implemented by hardware, software, firmware or any combination thereof. In the aforementioned embodiments, the operations or the methods may be implemented by software or firmware stored in memories and executed by suitable instruction-executing systems. For example, if implemented by hardware, the operations or methods may be implemented by any one or any combination of the following techniques known in the art: discrete logic circuits having logic circuits for implementing logic functions with respect to digital signals, application specific integrated circuits having suitably combined logic circuits, programmable gate arrays (PGAs), field programmable gate arrays (FPGAs), and the like.

Although the embodiments of the present disclosure have been illustrated and described above, it is to be appreciated that the foregoing embodiments are illustrative and cannot be considered as limitations to the present disclosure. Those skilled in the art may change, modify, replace and vary the foregoing embodiments within the scope of the present disclosure.

The invention claimed is:

1. A control method for controlling an electronic apparatus, wherein the electronic apparatus comprises an camera module and a touch screen, the camera module comprises an image sensor, the image sensor comprises a photosensitive pixel unit array and a color filter unit array disposed over the photosensitive pixel unit array, the photosensitive pixel unit array comprises a plurality of photosensitive pixel units each comprising a plurality of photosensitive pixels, the color filter unit array comprising a plurality of color filter units that each cover a corresponding photosensitive pixel unit, the control method comprising:

controlling the image sensor to output a merged image and a color block image of a same scene, wherein the merged image comprises a merged pixel array comprising a plurality of merged pixels arranged in a predetermined array pattern, wherein each of the plurality of merged pixels is output by a corresponding merged photosensitive pixel, wherein the plurality of photosensitive pixels of a corresponding photosensitive pixel unit of the photosensitive pixel unit array are merged into the corresponding merged photosensitive pixel, the color block image comprises a plurality of image pixel units arranged in the predetermined array pattern, wherein each of the plurality of image pixel units comprises a plurality of original pixels having a same color, wherein each of the plurality of original pixels is output by a corresponding photosensitive pixel of the plurality of photosensitive pixels;

defining a predetermined region on the merged image based on a user input;

converting the color block image into an imitating image using a first interpolating method, wherein the imitating image comprises a plurality of imitating pixels arranged in the predetermined array pattern, the plurality of imitating pixels comprise a current pixel, the plurality of original pixels of each image pixel unit of the plurality of image pixel units comprise a related pixel corresponding to a position of the current pixel, the color block image comprises a predetermined region having a same size as the predetermined region of the merged image, and converting the color block image into the imitating image comprises:

determining whether the related pixel is located in the predetermined region of the color block image;

when the related pixel is located in the predetermined region of the color block image, determining whether a color of the current pixel is same as a color of the related pixel;

when the color of the current pixel is same as the color of the related pixel, using a pixel value of the related pixel as a pixel value of the current pixel; and when the color of the current pixel is different from the color of the related pixel, using pixel values of a related pixel unit to calculate the pixel value of the current pixel through the first interpolating method, wherein the related pixel unit is selected from the plurality of image pixel units, a color of the related pixel unit is same as the current pixel, and the related pixel unit adjacent to the related pixel;

converting the merged image into a restored image corresponding to the imitating image using a second interpolating method, wherein the restored image has the same pixel number as the imitating image, a complexity of the second interpolating method is lower than a complexity of the first interpolating method; and obtaining a synthesized imitating image by synthesizing the imitating image and the restored image.

2. The control method of claim 1, wherein the predetermined array pattern is a Bayer pattern.

3. The control method of claim 1, wherein the image pixel unit comprises the original pixels arranged in a 2*2 array.

4. The control method of claim 1, wherein the step of using the pixel values of the related pixel unit to calculate the pixel value of the current pixel through the first interpolating method comprises:

for each direction, calculating a corresponding difference value of the related pixel;

for each direction, calculating a corresponding weight of the related pixel; and using the corresponding difference value of each direction and the corresponding weight of each direction to calculate the pixel value of the current pixel.

5. The control method of claim 1, wherein before the step of using the pixel values of the related pixel unit to calculate the pixel value of the current pixel through the first interpolating method, the control method further comprises:

performing white balance compensation on the color block image; and after the step of using the pixel values of the related pixel unit to calculate the pixel value of the current pixel through the first interpolating method, the control method further comprises:

performing white balance compensation restoration on the imitating image.

6. The control method of claim 1, wherein before the step of using the pixel values of the related pixel unit to calculate the pixel value of the current pixel through the first interpolating method, the control method further comprises:

performing dead pixel compensation on the color block image.

7. The control method of claim 1, wherein before the step of using the pixel values of the related pixel unit to calculate the pixel value of the current pixel through the first interpolating method, the control method further comprises:

performing crosstalk compensation on the color block image.

8. The control method of claim 1, wherein after the step of using the pixel values of the related pixel unit to calculate the pixel value of the current pixel through the first interpolating method, the control method further comprises:

performing lens shading correction, demosaicing, noise reduction, and edge sharpening on the imitating image.

9. The control method of claim 1, wherein the step of defining the predetermined region on the merged image based on the user input comprises:

using a third interpolating method to convert the merged image into a preview image, wherein the third interpolating method comprises the second interpolating method;

controlling the touch screen to display the preview image; and defining the predetermined region based on the user input to the touch screen.

10. The control method of claim 9, wherein the step of defining the predetermined region based on the user input to the touch screen comprises:

dividing the preview image into expanding units arranged in an array;

identifying a touched position based on the user input;

determining an origin expanding unit residing at the touched position, wherein the expanding units comprise the origin expanding unit;

calculating a contrast value of each expanding unit outer than the origin expanding unit as a center;

determining edge expanding units that have contrast values each of which exceeds a predetermined threshold, wherein the expanding units comprise the edge expanding units; and defining a region enclosed by the edge expanding units as the predetermined region.

11. The control method of claim 9, wherein the step of defining the predetermined region based on the user input to the touch screen comprises:

identifying a touched position based on the user input; and with respect to the touched position as a center, expanding outwardly to form a region having a predetermined shape, wherein the region is defined as the predetermined region.

12. The control method of claim 11, wherein the step of, with respect to the touched position as a center, expanding outwardly to form the region having the predetermined shape comprises:

determining the predetermined shape based on the user input.

13. A control apparatus configured to control an electronic apparatus, wherein the electronic apparatus comprises an camera module and a touch screen, the camera module comprises an image sensor, the image sensor comprises a photosensitive pixel unit array and a color filter unit array disposed over the photosensitive pixel unit array, the photosensitive pixel unit array comprising a plurality of photosensitive pixel units which each comprise a plurality of photosensitive pixels, the color filter unit array comprising a plurality of color filter units that each cover a corresponding photosensitive pixel unit, the control apparatus comprising: a non-transitory computer-readable medium comprising computer-executable instructions stored thereon, and an instruction-executing system which is configured by the instructions to implement:

an outputting module configured to control the image sensor to output a merged image and a color block image of a same scene, wherein the merged image comprises a merged pixel array comprising a plurality of merged pixels arranged in a predetermined array pattern, wherein each of the plurality of merged pixels is output by a corresponding merged photosensitive pixel, wherein the plurality of photosensitive pixels of a corresponding photosensitive pixel unit of the photosensitive pixel unit array are merged into the corresponding merged photosensitive pixel, the color block image comprises a plurality of image pixel units arranged in the predetermined array pattern, wherein each of the plurality of image pixel units comprises a plurality of original pixels having a same color, wherein each of the plurality of original pixels is output by a corresponding photosensitive pixel of the plurality of photosensitive pixels;
a defining module configured to define a predetermined region on the merged image based on a user input;
a first converting module configured to convert the color block image into an imitating image using a first interpolating method, wherein the imitating image comprises a plurality of imitating pixels arranged in the predetermined array pattern, the plurality of imitating pixels comprise a current pixel, the plurality of original pixels of each image pixel unit of the plurality of image pixel units comprise a related pixel corresponding to a position of the current pixel, the color block image comprises a predetermined region having a same size as the predetermined region of the merged image, and the first converting module comprises:
a first determining module configured to determine whether the related pixel is located in the predetermined region of the color block image;
a second determining module configured to, when the related pixel is located in the predetermined region of the color block image, determine whether a color of the current pixel is same as a color of the related pixel;
a first calculating module configured to, when the color of the current pixel is same as the color of the related pixel, use a pixel value of the related pixel as a pixel value of the current pixel; and
a second calculating module configured to, when the color of the current pixel is different from the color of the related pixel, use pixel values of a related pixel unit to calculate the pixel value of the current pixel through the first interpolating method, wherein the related pixel unit is selected from the plurality of image pixel units, a color of the related pixel unit is same as the current pixel, and the related pixel unit adjacent to the related pixel;
a third calculating module configured to convert the merged image into a restored image corresponding to the imitating image using a second interpolating method, wherein the restored image has the same pixel number as the imitating image, a complexity of the second interpolating method is lower than a complexity of the first interpolating method; and
a synthesizing module configured to obtain a synthesized imitating image by synthesizing the imitating image and the restored image.

14. The control apparatus of claim 13, wherein the predetermined array pattern is a Bayer pattern.

15. The control apparatus of claim 13, wherein the image pixel unit comprises the original pixels arranged in a 2*2 array.

16. The control apparatus of claim 13, wherein the second calculating module comprises:
a first calculating unit configured to, for each direction, calculate a corresponding difference value of the related pixel;
a second calculating unit configured to, for each direction, calculate a corresponding weight of the related pixel; and
a third calculating unit configured to use the corresponding difference value of each direction and the corresponding weight of each direction to calculate the pixel value of the current pixel.

17. The control apparatus of claim 13, wherein the defining module comprises:
a second converting module configured to use a third interpolating method to convert the merged image into a preview image, wherein the third interpolating method comprises the second interpolating method;
a displaying module configured to control the touch screen to display the preview image; and
a second processing module configured to define the predetermined region based on the user input to the touch screen.

18. The control apparatus of claim 17, wherein the second processing module comprises:
a dividing unit configured to divide the preview image into expanding units arranged in an array;
a first identifying unit configured to identify a touched position based on the user input;
a determining unit configured to determine an origin expanding unit residing at the touched position, wherein the expanding units comprise the origin expanding unit;
a fourth calculating unit configured to calculate a contrast value of each expanding unit outer than the origin expanding unit as a center;
a first processing unit configured to determine edge expanding units that have contrast values each of which exceeds a predetermined threshold, wherein the expanding units comprise the edge expanding units; and
a second processing unit configured to define a region enclosed by the edge expanding units as the predetermined region.

19. The control apparatus of claim 17, wherein the second processing module comprises:
a second identifying unit configured to identify a touched position based on the user input; and
an expanding unit configured to, with respect to the touched position as a center, expand outwardly to form a region having a predetermined shape, wherein the region is defined as the predetermined region.

20. An electronic apparatus, comprising:
a camera module;
a touch screen, wherein the image sensor comprises an image sensor, the image sensor comprises a photosensitive pixel unit array and a color filter unit array disposed over the photosensitive pixel unit array, the photosensitive pixel unit array comprising a plurality of photosensitive pixel units which each comprise a plurality of photosensitive pixels, the color filter unit array comprising a plurality of color filter units each covering a corresponding photosensitive pixel unit; and
a control apparatus comprising:
an outputting module configured to control the image sensor to output a merged image and a color block image of a same scene, wherein the merged image comprises a merged pixel array comprising a plurality of merged pixels arranged in a predetermined array pattern, wherein each of the plurality of merged pixels is output by a corresponding merged photosensitive pixel, wherein the plurality of photosensitive pixels of a corresponding photosensitive pixel unit of the photosensitive pixel unit array are merged into the corresponding merged photosensitive pixel, the color block image comprises a plurality of image pixel units arranged in the predetermined array pattern, wherein each of the plurality of image pixel units comprises a plurality of original pixels having a same color, wherein each of the plurality of original pixels is output by a corresponding photosensitive pixel of the plurality of photosensitive pixels;

a defining module configured to define a predetermined region on the merged image based on a user input;

a first converting module configured to convert the color block image into an imitating image using a first interpolating method, wherein the imitating image comprises a plurality of imitating pixels arranged in the predetermined array pattern, the plurality of imitating pixels comprise a current pixel, the plurality of original pixels of each image pixel unit of the plurality of image pixel units comprise a related pixel corresponding to a position of the current pixel, the color block image comprises a predetermined region having a same size as the predetermined region of the merged image, and the first converting module comprises:

a first determining module configured to determine whether the related pixel is located in the predetermined region of the color block image;

a second determining module configured to, when the related pixel is located in the predetermined region of the color block image, determine whether a color of the current pixel is same as a color of the related pixel;

a first calculating module configured to, when the color of the current pixel is same as the color of the related pixel, use a pixel value of the related pixel as a pixel value of the current pixel; and a second calculating module configured to, when the color of the current pixel is different from the color of the related pixel, use pixel values of a related pixel unit to calculate the pixel value of the current pixel through the first interpolating method, wherein the related pixel unit is selected from the plurality of image pixel units, a color of the related pixel unit is same as the current pixel, and the related pixel unit adjacent to the related pixel;

a third calculating module configured to convert the merged image into a restored image corresponding to the imitating image using a second interpolating method, wherein the restored image has the same pixel number as the imitating image, a complexity of the second interpolating method is lower than a complexity of the first interpolating method; and a synthesizing module configured to obtain a synthesized imitating image by synthesizing the imitating image and the restored image.

* * * * *